United States Patent
Kawamura et al.

(10) Patent No.: US 9,300,855 B2
(45) Date of Patent: Mar. 29, 2016

(54) IMAGING APPARATUS, IMAGING METHOD, INTEGRATED CIRCUIT, AND COMPUTER PROGRAM

(75) Inventors: Takashi Kawamura, Kyoto (JP); Yasunobu Ogura, Osaka (JP)

(73) Assignee: PANASONIC CORPORATION, Osaka (JP)

(*) Notice: Subject to any disclaimer, the term of this patent is extended or adjusted under 35 U.S.C. 154(b) by 519 days.

(21) Appl. No.: 13/697,728

(22) PCT Filed: Mar. 14, 2012

(86) PCT No.: PCT/JP2012/001778
§ 371 (c)(1),
(2), (4) Date: Nov. 13, 2012

(87) PCT Pub. No.: WO2012/124321
PCT Pub. Date: Sep. 20, 2012

(65) Prior Publication Data
US 2013/0057681 A1    Mar. 7, 2013

(30) Foreign Application Priority Data
Mar. 14, 2011   (JP) .................... 2011-055109

(51) Int. Cl.
*H04N 5/232* (2006.01)
*G03B 3/00* (2006.01)
*G03B 7/14* (2006.01)

(52) U.S. Cl.
CPC .............. *H04N 5/23212* (2013.01); *G03B 3/00* (2013.01); *G03B 7/14* (2013.01)

(58) Field of Classification Search
CPC .......... H04N 5/23212; G03B 3/00; G03B 7/14
USPC ................. 348/345, 222.1, 239, 207.99
See application file for complete search history.

(56) References Cited

U.S. PATENT DOCUMENTS

| | | | |
|---|---|---|---|
| 5,124,842 A | 6/1992 | Honda et al. | |
| 5,148,502 A | 9/1992 | Tsujiuchi et al. | |
| 6,774,944 B1 | 8/2004 | Fukuyama | |
| 7,176,975 B2 | 2/2007 | Matsunaga et al. | |
| 7,817,911 B2 | 10/2010 | Tanaka et al. | |
| 2002/0191100 A1 | 12/2002 | Matsunaga et al. | |

(Continued)

FOREIGN PATENT DOCUMENTS

| | | |
|---|---|---|
| DE | 23 01 800 | 10/1974 |
| JP | 5-27084 | 4/1985 |

(Continued)

OTHER PUBLICATIONS

International Search Report issued May 22, 2012 in corresponding International (PCT) Application No. PCT/JP2012/001778.

(Continued)

*Primary Examiner* — Nhan T Tran
(74) *Attorney, Agent, or Firm* — Wenderoth, Lind & Ponack, L.L.P.

(57) ABSTRACT

A camera limits an EDOF range using F-DOF through user interactions without causing any discomfort, and includes: a user input unit for accepting input of a focal length; a range determination unit for determining a moving range of an in-focus position, based on the focal length; and an imaging unit for capturing an image in such a manner that the in-focus position moves in the moving range during a exposure time.

11 Claims, 16 Drawing Sheets

(56) References Cited

U.S. PATENT DOCUMENTS

| | | | |
|---|---|---|---|
| 2008/0013941 | A1 | 1/2008 | Daley |
| 2009/0097836 | A1 | 4/2009 | Tanaka et al. |
| 2009/0225199 | A1* | 9/2009 | Ferren .................. 348/240.99 |
| 2011/0292364 | A1* | 12/2011 | Kawamura .................. 355/55 |
| 2012/0062787 | A1* | 3/2012 | Muijs et al. .................. 348/345 |

FOREIGN PATENT DOCUMENTS

| | | |
|---|---|---|
| JP | 01-309478 | 12/1989 |
| JP | 05-313068 | 11/1993 |
| JP | 10-257373 | 9/1998 |
| JP | 3084130 | 9/2000 |
| JP | 3191928 | 7/2001 |
| JP | 2003-008966 | 1/2003 |
| JP | 2009-098351 | 5/2009 |

OTHER PUBLICATIONS

Edward R. Dowski et al., "Extended depth of field through wavefront coding", Applied Optics, vol. 34, No. 11, Apr. 10, 1995, pp. 1859-1866.

Anat Levin et al., "Image and Depth from a Conventional Camera with a Coded Aperture", ACM Transactions on Graphics, vol. 26, No. 3, Article 70, Jul. 2007, pp. 70-1-70-9.

Hajime Nagahara et al., "Flexible Depth of Field Photography", European Conference on Computer Vision (ECCV), Morning Session 2: Computational Photography, Oct. 16, 2008.

Christel-Loic Tisse et al., "Extended depth-of-field (EDoF) using sharpness transport across colour channels", Proceedings of SPIE, vol. 7061, Imaging in the Optical Design Process: Depth of Field, Sep. 11, 2008.

Wanli Chi et al., "Computational imaging with the logarithmic asphere: theory", Optical Society of America, vol. 20, No. 12, Dec. 2003.

Yasuhisa Takahashi et al., "Optimized free-form phase mask for extension of depth of field in wavefront-coded imaging", Optical Society of America, Optics Letters, vol. 33, No. 13, Jul. 1, 2008.

Yasuhisa Takahashi et al., "Optimized phase mask for wave-front coding: Extended DOF in off axis field", Optics and Photonics Japan 2007, Extended Abstracts, Nov. 27, 2007, pp. 464-465 (27p C2), with English translation.

* cited by examiner

| F Number | The number of steps N | MOD [m] | Image-plane-side distance [μm] |
|---|---|---|---|
| 1.4 | 1 | 77.14 | 4.2 |
| 2 | 2 | 54.00 | 6.0 |
| 2.8 | 3 | 38.57 | 8.4 |
| 4 | 4 | 27.00 | 12.0 |
| 5.7 | 5 | 18.95 | 17.1 |
| 8 | 6 | 13.50 | 24.0 |
| 11.3 | 7 | 9.56 | 34.0 |
| 16 | 8 | 6.75 | 48.1 |
| 22.6 | 9 | 4.78 | 68.1 |
| 32 | 10 | 3.38 | 96.5 |
| 45.3 | 11 | 2.38 | 136.9 |
| 64 | 12 | 1.69 | 194.1 |
| 90.5 | 13 | 1.19 | 275.7 |
| 128 | 14 | 0.84 | 392.4 |
| 181 | 15 | 0.60 | 559.9 |
| 256 | 16 | 0.42 | 802.2 |
| 362 | 17 | 0.30 | 1155.7 |
| 512 | 18 | 0.21 | 1679.3 |

| f [mn] | 18 |
|---|---|
| ipsilon [mn] | 1.5 |

FIG. 11
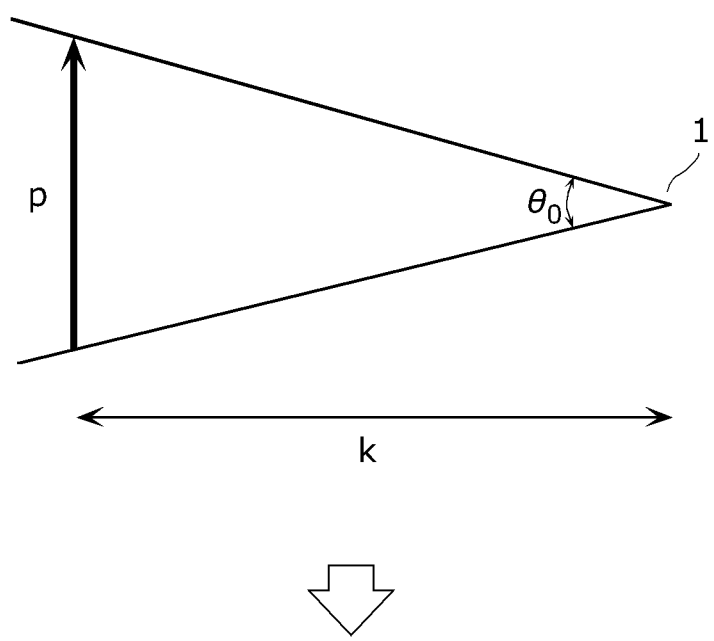
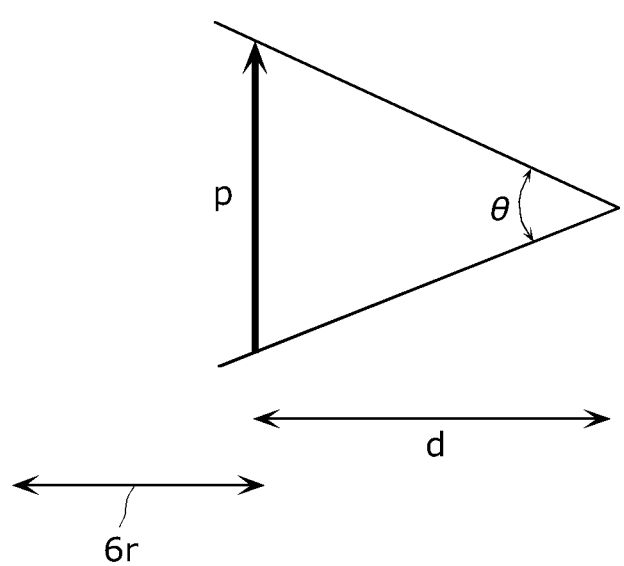

IMAGING APPARATUS, IMAGING METHOD, INTEGRATED CIRCUIT, AND COMPUTER PROGRAM

TECHNICAL FIELD

The present invention relates to an imaging apparatus which captures an image in such a manner that an in-focus position moves during an exposure time to achieve an extended depth of field.

BACKGROUND ART

Conventionally is an imaging apparatus for capturing an image in such a manner that an in-focus position moves during an exposure time to achieve an extended depth of field. The imaging apparatus captures an image in such a manner that the in-focus position moves in a moving range during the exposure time (see PTL 3, etc.).

CITATION LIST

Patent Literature

[PTL 1] West Germany Patent No. 2301800 (DE Patent: Filed Jan. 15, 1973)
[PTL 2] Japanese Examined Patent Publication No. H5-27084
[PTL 3] Japanese Patent No. 3191928
[PTL 4] US Published Patent Application No. 2008/0013941
[PTL 5] Japanese Patent No. 3084130

Non Patent Literature

[NPL 1] E. R. Dowski and W. T. Cathey, "Extended depth of field through wave-front coding", Applied Optics, Vol. 34, No. 11, P. 1859-1866 (1995)
[NPL 2] A. Levin, R. Fergus, F. Durand and W. T. Freeman, "Image and Depth from a Conventional Camera with a Coded Aperture", ACM Transactions on Graphics, Vol. 26, No. 3, Article 70, 70-1 to 70-9 (2007)
[NPL 3] H. Nagahara, S. Kuthirummal, C. Zhou and S. Nayar, "Flexible Depth of Field Photography", European Conference on Computer Vision (ECCV), October 16th, Morning Session 2: Computational Photography (2008)
[NPL 4] C. Tisse, H. P. Nguyen, R. Tesieres, M. Pyanet and F. Guichard, "Extended Depth-of-field (EDOF) using sharpness transport a cross colour channels", Optical Engineering+Applications, Part of SPIE Optics+Photonics, Session 1—Imaging in the Optical Design Process: Depth of Field (2008)
[NPL 5] W. Chi and N. George, "Computational imaging with the logarithmic a sphere: theory", Optical Society of America, Vol. 20, No. 12, December (2003)
[NPL 6] Y. Takahashi and S. Komatsu, "Optimized free-form phase mask for extension of depth of field in wave front-coded imaging", Optical Society of America, Optics Letters, Vol. 33, No. 13, Jul. 1, (2008)
[NPL 7] Y. Takahashi, R. Obana, and S. Komatsu, "Optimized phase mask for wave-front coding: Extended DOF in off axis field, Optics & Photonics Japan 2007, Extended Abstracts, pp. 464-465 (27p C2), (2007)

SUMMARY OF INVENTION

Technical Problem

However, the moving range of the in-focus position may be inappropriate.

Thus, an object of the present invention is to provide an imaging apparatus which allows an appropriate moving range of the in-focus position, an imaging method, an integrated circuit, and a program.

Solution to Problem

To achieve the above object, an imaging apparatus according to one aspect of the present invention is an imaging apparatus for capturing an image in such a manner that an in-focus position moves during an exposure time to achieve an extended depth of field, the imaging apparatus including: an input unit configured to accept input of a focal length; a moving range determination unit configured to determine a moving range of an in-focus position, based on the focal length; and an imaging unit configured to capture an image in such a manner that the in-focus position moves in the moving range during an exposure time.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

An imaging apparatus according to the present invention allows an appropriate moving range of an in-focus position.

BRIEF DESCRIPTION OF DRAWINGS

FIG. 4 is a diagram showing configurations of a camera control unit and so on.

FIG. 7 is a diagram showing configurations of a camera control unit and so on.

FIG. 11 is a diagram showing a relationship between an angle of view, the subject distance, and the size of the subject.

Figure 1:
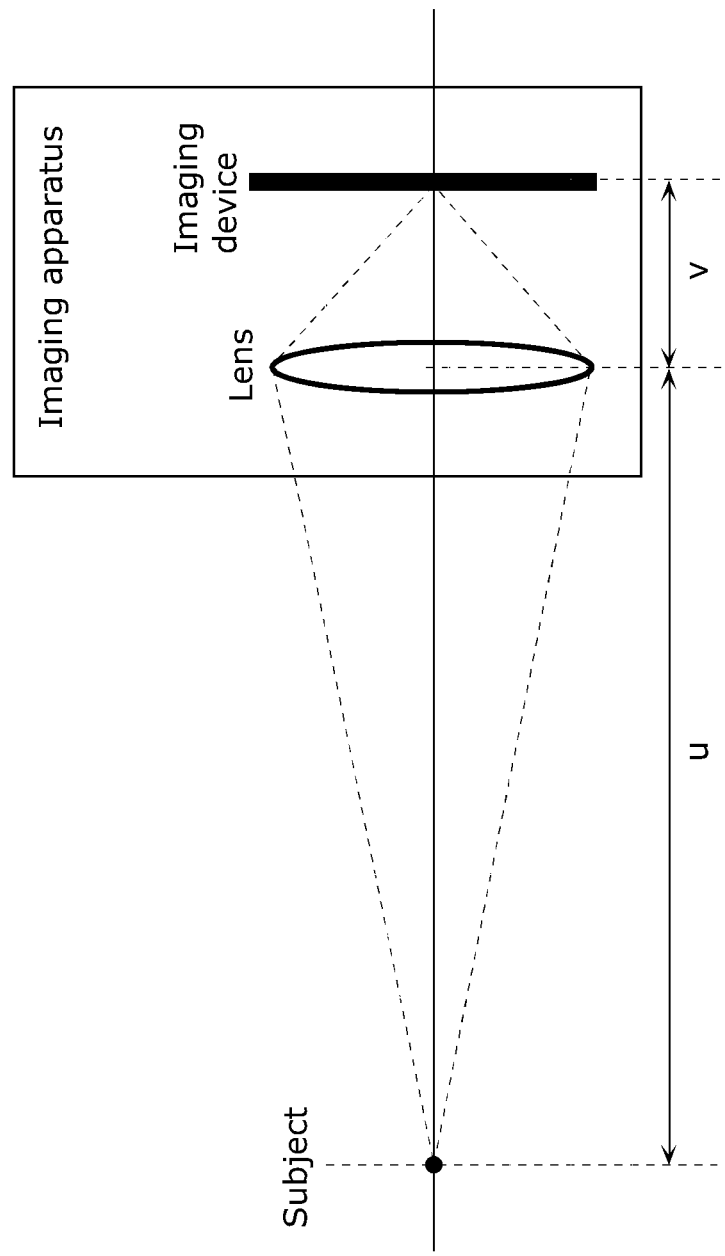
FIG. 1 is a diagram defining a positional relationship between a subject distance u and an image-plane-side distance v in a common camera.

DESCRIPTION OF EMBODIMENTS (Underlying Knowledge Forming Basis of the Present Disclosure)

In relation to the imaging apparatus described in the Background Art section, the inventors have found the following problems:

Specifically, there are ordinary cameras which are not the above-mentioned imaging apparatus in which the in-focus position moves. Examples of the ordinary camera include digital cameras and mobile phones. The ordinary cameras may be provided with zoom functions, allowing changeable focal length.

Thus, it is conceivable that the above-mentioned imaging apparatus is also provided with a similar zoom function as such a zoom function, allowing changeable focal length.

Therefore, it is conceivable that a range appropriate as a moving range in the imaging apparatus, in which the in-focus position moves, is a range that corresponds to the focal length in such a manner that when the focal length is one length the appropriate range is one range, and when the focal length is the other length the appropriate range is the other range.

Meanwhile, in conventional literature, the author of the literature selects, by intuition, a range believed by the author as a moving range whereby the results of the author's study is made full use. In the conventional literature, the range selected by the author in such a manner is disclosed merely as the moving range in the description of the results of the author's study.

Thus, the conventional imaging apparatus ends up having a fixed moving range, irrespective of the focal length. Thus, depending on the focal length, the fixed range is off a range that corresponds to the focal length, ending up inappropriate.

To solve such a problem, an imaging apparatus according to one aspect of the present invention is an imaging apparatus for capturing an image in such a manner that an in-focus position moves during an exposure time to achieve an extended depth of field, the imaging apparatus including: an input unit configured to accept input of a focal length; a moving range determination unit configured to determine a moving range (see a range 7r) of an in-focus position (a position at which a video of the focused subject is imaged), based on the focal length; and an imaging unit configured to capture an image in such a manner that the in-focus position moves in the moving range during an exposure time.

According to the above configuration, while the focal length is changed because the zoom function is provided, (information specifying) the focal length is inputted. This, based on the focal length, determines a range corresponding to the focal length as the moving range, preventing an inappropriate moving range. Thus, the moving range can be appropriate.

It should be noted that, for example, control may be performed so that the in-focus position moves in a range from one end of the moving range to the other end.

It should be noted that the moving range determination unit may determine the moving range an extent of which does not exceed an upper bound determined based on the focal length.

According to the above configuration, the extent of the moving range is set less than or equal to the upper bound, and a rate at which the in-focus position moves is slowed down. This extends a duration in which the in-focus position is being located at a position included in the moving range, and a duration in which the subject present at a distance corresponding to the position is being focused. This sufficiently improves image quality of the video of the subject. In other words, the image quality can sufficiently be improved, irrespective of the focal length.

It should be noted that the above-described upper bound is, for example, a value whereby the above-described image quality of the subject is sufficiently increased.

Figure 12:
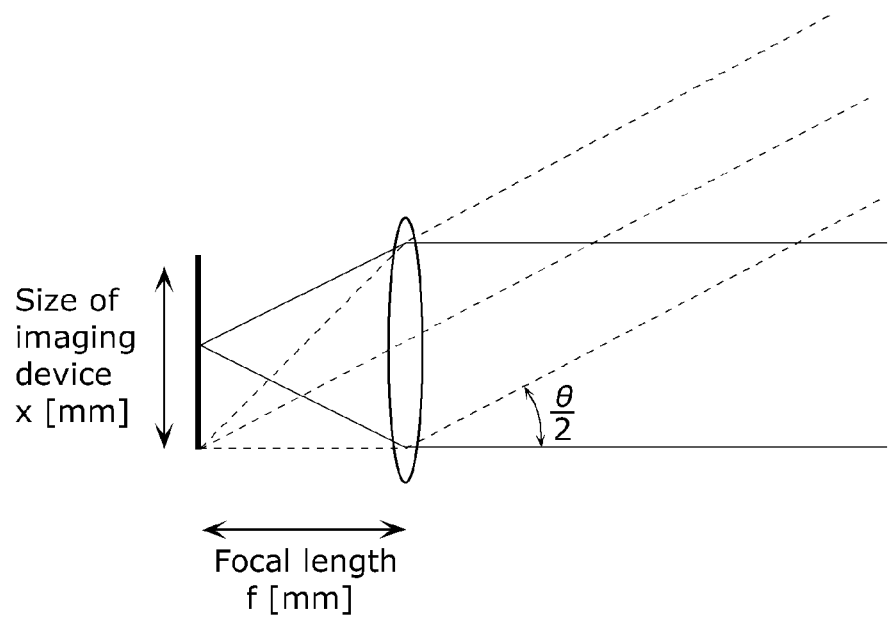
FIG. 12 is a diagram showing a relationship between a maximum angle of view, the focal length, and the size of an imaging device.

It should be noted that the upper bound may include a first upper bound (square points shown in FIG. 14) corresponding to a position (see a distance d shown in FIG. 11) at which an image of an object (an image of which is captured, such as person) having a predetermined size (see p shown in FIG. 11) is captured to a predefined size (see x shown in FIG. 12).

According to the above configuration, the first upper bound is represented by, for example, $\Delta v_{AIF}$ in Equation 12. This achieves each effect obtained by setting the upper bound $\Delta v_{AIF}$.

It should be noted that the upper bound may include a second upper bound (see diamond points, triangular points, and cross points) for satisfying a predetermined image quality (see N described below).

According to the above configuration, the second upper bound is represented by, for example, $\Delta_{NLim}$ in Equation 4. This achieves each effect obtained by setting the upper bound $\Delta_{NLim}$.

It should be noted that the upper bound may include the first upper bound and the second upper bound, and when the first upper bound is greater than the second upper bound (a portion 1n), the moving range determination unit may determine, as the moving range, a range (a range 1y) that includes a position (see a position 1y1) obtained from information on a subject acquired by the input unit.

According to the above configuration, there is a case where the first upper bound is greater than the second upper bound and the determined extent of the moving range is significantly small, without exceeding the second upper bound that is relatively small. Even in such as case, the range which includes the position of the subject indicated by the acquired information is determined as the moving range, thereby determining an appropriate moving range. This determines an appropriate moving range even in the above-described case, thereby the determined moving range is highly accurately appropriate.

It should be noted that the input unit may specify the subject, and the extended-depth-of-field range determination unit may: include an in-focus position detection unit configured to measure a distance to the specified subject; and when the first upper bound is greater than the second upper bound, determine, as the moving range, a range that includes a position of the measured distance.

According to the above configuration, the configuration can be kept simple by, for example, using, as the functionality of measuring a distance, the functionality of measuring a distance in autofocus.

It should be noted that the imaging apparatus may further include: an exposure meter; and a camera parameter determination unit configured to determine a shutter speed, an F-number, and an ISO (International Organization for Standardization) speed, based on brightness information for a capturing condition obtained using the exposure meter, wherein the moving range determination unit may determine the moving range, based on at least one of the determined shutter speed, the determined F-number, and the determined ISO speed, in addition to the focal length.

According to the above configuration, when determining the moving range, the accuracy of the moving range to be determined is enhanced by taking the F-number into account, for example.

It should be noted that the imaging apparatus may further include a signal processing unit configured to perform a restoration process for enhancing sharpness of a captured image to be outputted by the imaging unit.

According to the above configuration, while the imaging apparatus performs the processes described above, the signal processing unit included in the imaging apparatus performs the restoration process. Thus, processing suitable for each process is possible as the restoration process and the process is appropriately performed.

It should be noted that there is a focused subject position where the focused subject is present which is a subject a video of which is sharp and has no blur.

Examples of the above-described in-focus position include an imaging position at which light from the focused subject converges at the position and a video of the focused subject is imaged to the position.

Examples of the imaging position include a position where an imaging device driven by the actuator is present.

The movement of the in-focus position in the moving range (a range $7r$ having the size $\Delta v$) may move the above-described focused subject position, corresponding to the in-focus position, in a subject side range (a range $6r$) corresponding to the above-described moving range.

In this manner, the imaging unit may move the above-described in-focus position in the above-described subject side range by controlling the operation of the imaging apparatus (such as the position of the imaging device).

In this manner, the subject side range in which the focused subject position is moved is used as the range corresponding to the focal length. Thus, the subject side range is an appropriate range.

It should be noted that the first upper bound is $\Delta v_{AIF}$ specified by, for example, the equation below where f represents the focal length, $\theta_0$ represents an angle of view, k represents a distance to a subject, and x represents a size of an imaging device.

According to the above configuration, the first upper bound can be specified by a relatively simple equation and the processing can be relatively simple.

Moreover, the second upper bound is $\Delta v_{NLim}$ specified by, for example, equation below where f represents the focal length, N represents an amount of extension of depth of field, $F_{no}$ represents an F-number, and $\epsilon$ represents a permissible circle of confusion.

According to the above configuration, the second upper bound can also be specified by a relatively simple equation and the processing can be sufficiently simple.

Moreover, the moving range determination unit may: when the first upper bound is smaller than the second upper bound (a portion $1m$), determine a range (for example, a range $1x$ shown in FIG. 14) from a position ($\Delta v=0$) corresponding to infinity to a position (the square points) of the first upper bound, as the moving range; and when the first upper bound is greater than the second upper bound (a portion $1n$), determine a portion (for example, a range $1y$), which is of the range and in which the position (a position $1y1$) obtained from the information on the subject is obtained, to the position of the first upper bound, as the moving range, and the portion may have a dimension less than or equal to the second upper bound ($\Delta v_{NLim}$) and includes the position (a position $1y1$) obtained from the information on the subject.

According to the above configuration, the size of the portion described above is merely less than or equal to the second upper bound, which obviates the need for perform unnecessary processing to calculate an upper bound other than the second upper bound. Thus, the processing to be performed can be simple.

Moreover, the reason why an aspect of the present invention is embodied will be described in detail below.

Specifically, in general, examples of the method to achieve the extended depth of field (hereinafter, referred to as EDOF) include manly the following three methods. The first method is to uniform blur in the depth direction by inserting an optical element known as a phase plate into an optical system. Then, in the method, an image restoration process is performed on an obtained image, using a previously measured blur pattern or a blur pattern calculated by simulation. This allows the method to generate an EDOF image. The method is known as Wavefront Coding (hereinafter, referred to as WFC) (see NPL 1 mentioned above).

The second method is to perform a highly accurate distance measurement for each of regions of an image by devising the shape of aperture. Then, in the method, an image restoration process is performed on each region, using a previously measured blur pattern corresponding to a distance of each region. This allows the method to generate an EDOF image. The method is known as Coded Aperture (hereinafter, referred to as CA) (see NPL 2).

The third method is to superimpose images one on the other which are uniformly focused in the depth direction (namely, synonymous with uniforming blur in each depth) by moving the focus lens or the imaging device during the exposure time. Then, in the method, an image restoration process is performed on an obtained image, using a previously measured blur pattern or a blur pattern calculated by simulation. This allows the method to generate an EDOF image. The method is known as Flexible DOF (hereinafter, referred to as F-DOF) (see NPL 3).

It should be noted that there are also the following methods in addition to the methods described above. Specifically, the method is to obtain an image the entirety of which is sharp, by image processing, in addition to depth estimation or image sharpness detection using the axial chromatic aberration of the lens (see NPL 4). Another method is to uniform blur in the depth direction using a multifocal lens, and perform an image restoration process using a previously measured blur pattern or a blur pattern calculated by simulation (see NPL 5). These methods, however, have drawbacks in that the EDOF effect is theoretically small as compared to the above-mentioned three methods.

In addition, a method known as Focal Stack has long been in existence. In this method, a plurality of images having different in-focus positions (focus positions) is captured and an image of a region which appears to be in focus is extracted from each of the images. Then, in the method, the extracted images are synthesized to generate the EDOF image. The method requires a large number of images to be captured, and thus has drawbacks in that it takes a relatively long time for capturing images and a relatively large amount memory is consumed.

Various types of phase plates are proposed for the first method, WFC, among the three methods described above. The types of phase plates that achieve the EDOF effect to a greatest extent include Cubic Phase Mask (hereinafter, referred to as CPM) and Free-Form Phase Mask (hereinafter, referred to as FPM). From the standpoint of image quality (low artifact) after restoration, FPM is regarded promising (see NPL 6).

However, disadvantage common to WFC is that the insertion of the phase plate deteriorates the characteristics off the optical axis of the lens (see NPL 7). Specifically, as compared to incident light from the front, the same blur uniform effect cannot be obtained with respect to incident light from other than the front. Thus, when the restoration process is performed for image restoration, using the blur pattern on the optical axis, the image quality off the optical axis after the restoration ends up degraded. Furthermore, for setting up a phase plate having an asymmetric shape as a lens unit such as CPM or FPM from which a high EDOF performance is obtained, a problem arises that eccentricity adjustment is generally difficult, as compared to the case of setting up a phase plate having a symmetric shape.

The second method, CA, among the three methods described above enhances accuracy in distance measurement by employing an unusual shape for aperture. Due to such characteristics of the second method itself, specific frequency components of captured images and images obtained by the restoration process are undesirably lost. In other words, the method has a drawback in that the image quality ends up degraded. Moreover, in the method, in general, the quantity of light decreases, irrespective of the aperture shape, as compared to an ordinary image-capturing method. Thus, the method is not for capturing images in dark.

The third method, the F-DOF, among the three methods described above is a method whereby a most favorable image quality is obtained, and also offers a high EDOF effect. Moreover, the off-axis characteristics depend on the lens characteristics itself, and therefore, the method is likely to enhance the performance. However, optical requirements are provided that the same subject need be superimposed one on the other at the same position on images even when the focus position is moved during exposure. Thus, an image-side telecentric lens need be provided.

As the application of the above-described EDOF technology, microscopes have the oldest history among all. In the present application, an image of a stationary object can be captured taking time, and thus Focal Stack method has long been employed. The method, however, is laborious and time-consuming as described above, and thus, some literature discloses employment of Focal Stack method in combination with the idea of the F-DOF method (see PTLs 1 to 4). It should be noted that as a method in which the F-DOF is applied to microscopes, the case of moving a specimen which is the subject and the case of moving the lens barrel, during exposure, are disclosed.

It should be noted that assuming the image restoration process after exposure, a way of moving a target is controlled so that blur in an image is constantly uniform; this is known to be rational because an image restoration process method using one blur pattern is applicable (see PTL 5). To that end, if the imaging device is the target to be moved, the imaging device need be moved at equal speeds. When moving the focus lens also, focus movement corresponding to moving an imaging plane at equal speeds need be performed (see NPL 3). It is known that a pattern in which the target is moved may be a pattern in which the target is moved from a focusing end position farther to a user to a focusing end position closer to the user, or vice versa.

Other application, in recent years, includes a camera incorporated in mobile phones. Applying the EDOF technology to the camera achieves the reduction in size of the camera. In other words, the EDOF effect allows an all-in-focus image (an image having all subjects in focus) to be obtained without employing the autofocus mechanism.

It should be noted that from the standpoint of the application, the F-DOF itself is not employed because a mechanism for moving the focus lens or the imaging device is required. A method using WFC or the axial chromatic aberration is employed.

Yet another conceivable application includes ordinary digital still cameras. Recent trends of digital still cameras demand for easy image-capturing that causes few failures. The EDOF technology is expected to achieve the all-in-focus image and free of mistakes in focusing.

In addition to the above, the following cases are also considered generally as cases where the extension of depth of field is desired.

The first case is where it is desired that an image of a fast moving subject is captured as if being stationary. In this case, the shutter speed is forced to be increased and the aperture is forced to be widened. Thus, the depth of field may be shallower than intended by a photographer.

The second case is where an image of a slow moving subject is captured in the following situation. Specifically, a situation may be considered where the capturing condition is dark, the shutter speed is forced to be set to a lower bound at which shake of hand is not caused and, additionally, the aperture is forced to be widened. In this case also, the depth of field may be shallower than intended by a photographer.

FIG. 1 is a diagram defining a positional relationship between a subject distance u and an image-plane-side distance v in a common camera.

Figure 2:
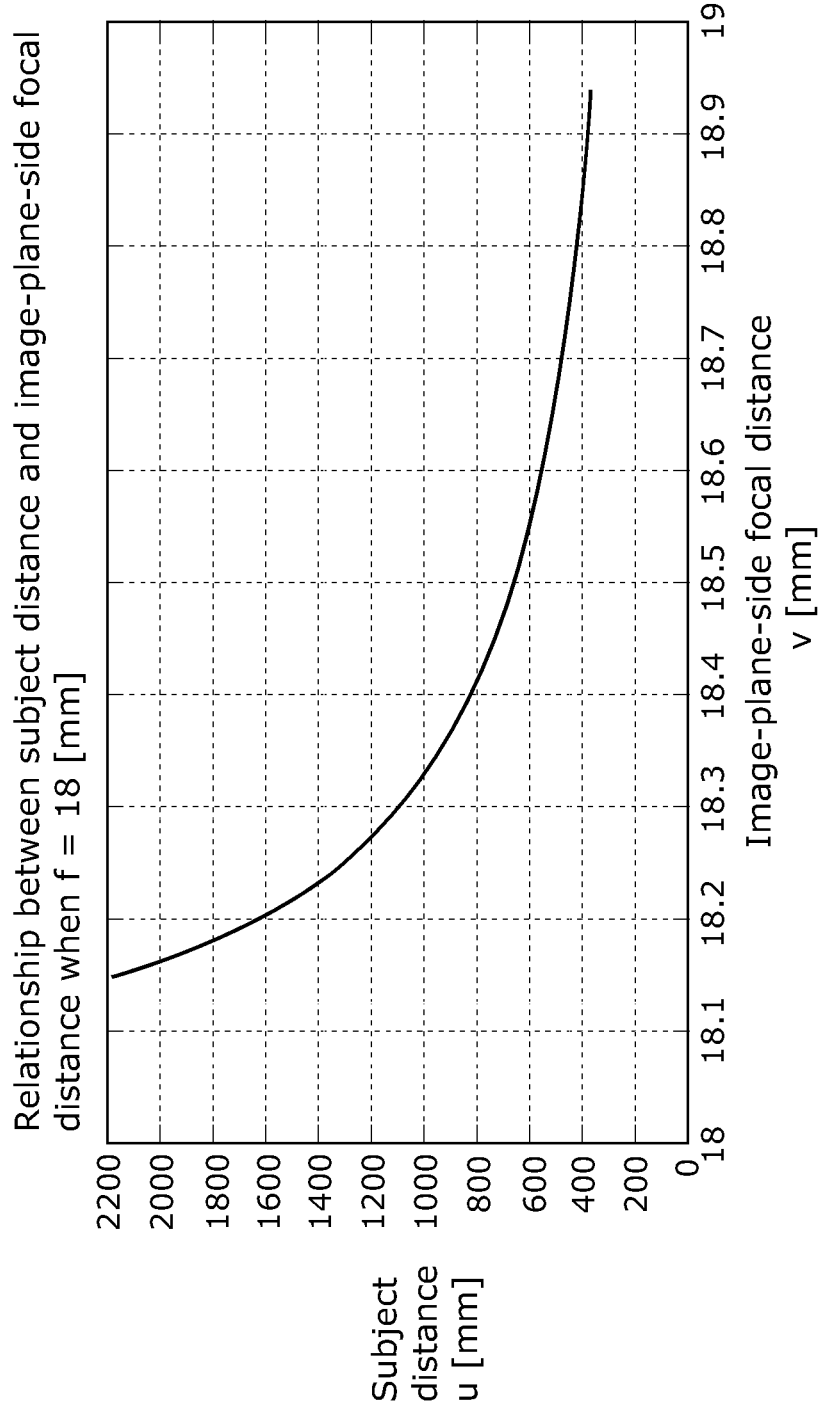
FIG. 2 is a diagram showing an example of the relationship between the subject distance u and the image-plane-side distance v when a focal length is 18 mm.

FIG. 2 is a diagram showing an example of a relationship between the subject distance u and the image-plane-side distance v when a focal length is 18 mm.

The last case is where an image of the subject at a close proximity is captured, such as macro photography. A situation is considered where the subject is imaged on the imaging device so that the relationship as illustrated in FIG. 1 is satisfied. An example of the relationship between u and v in this situation is illustrated in FIG. 2. A range of the depth of field can be considered as a given range in terms of an image-plane-side distance on the horizontal axis shown in FIG. 2. Considering the given range on the horizontal axis in FIG. 2, the ranges of the depth of field on the subject side in the case of a subject at a close range, for example, positioned at 40 cm away and the case of a subject at a far distance, for example, positioned at 2 m away is as follows. Specifically, it can be seen that the range of depth of field in the case of the subject at 40 cm away is remarkably narrow. As described above, when taking a macro image of flowers, insects, or the like, the focal range is extremely narrow. Thus, there exist needs to extend the depth of field.

In the application, the following is required. Specifically, high image quality is required. Moreover, it is required that the EDOF effect is great and the EDOF range is changeable optionally. Moreover, it is required that it can be achieved by application of an ordinary autofocus mechanism (no special optical system is required). Moreover, it is required that EDOF image capturing and normal image capturing are readily switchable therebetween. For such requirements, the F-DOF is the most excellent method among the methods described above.

A configuration necessary to achieve the F-DOF will be described with reference to FIG. 3 and FIG. 4.

Figure 3:
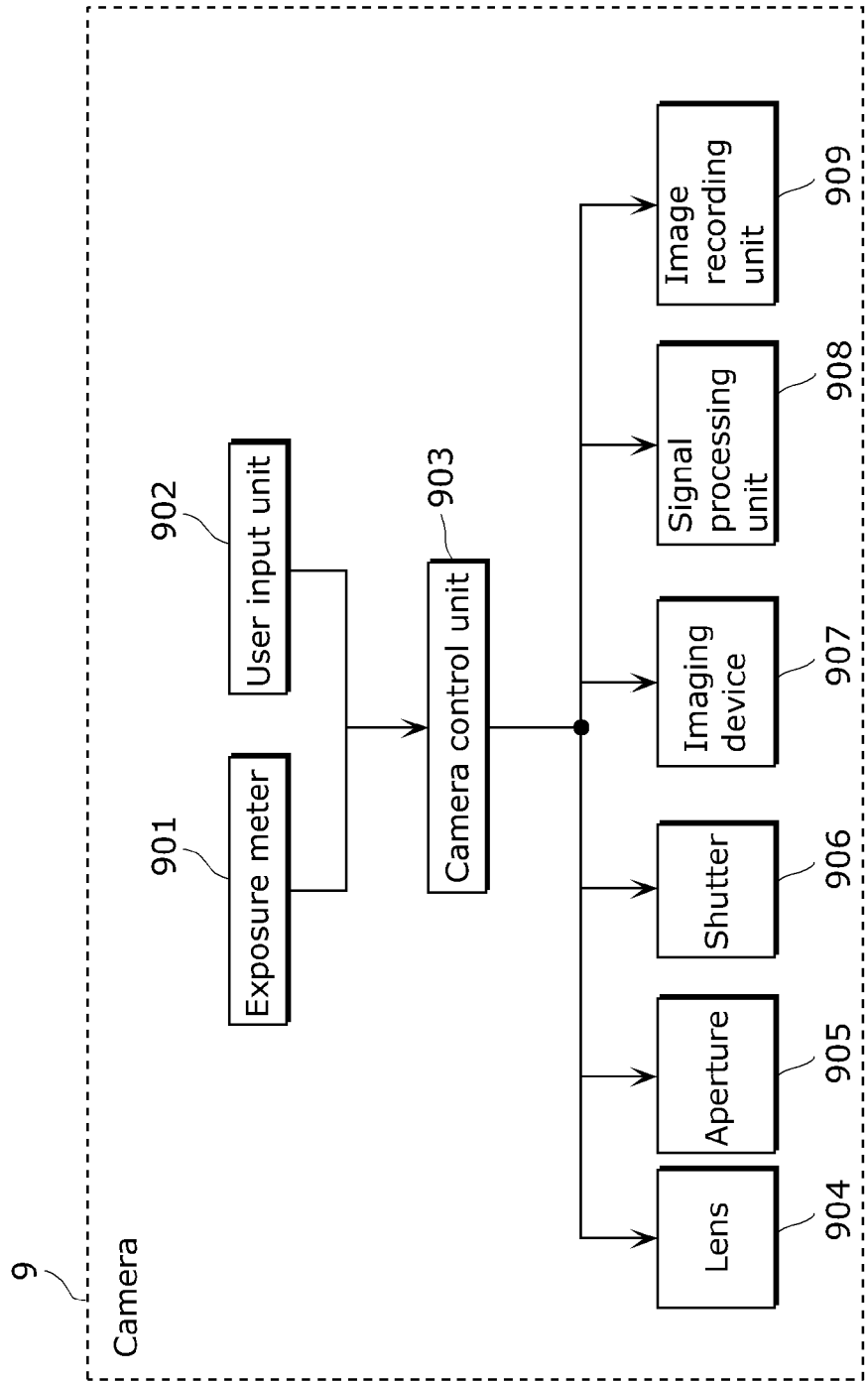
FIG. 3 is a diagram showing a hardware configuration of the common camera.

FIG. 3 shows an example configuration of a camera 9 involved in achieving the F-DOF.

The camera 9 includes an exposure meter 901, a user input unit 902, a camera control unit 903, a lens 904, an aperture 905, a shutter 906, an imaging device 907, a signal processing unit 908, and an image recording unit 909. It should be noted that FIG. 4 described below shows internal configurations of the camera control unit 903 and so on for achieving the FDOF operation that are shown in FIG. 3. As will be described below, the camera control unit 903 includes a camera parameter determination unit 9a, an image plane movement control and imaging unit 9b, and an EDOF range specifying unit 9c. As shown in FIG. 4, the signal processing unit 908 includes an image restoration processing unit 9d and a restoration PSF storage unit 9e.

In typical example of operation in capturing an image, a user aims a camera, immediately before taking an image, to determine the angle of view, specify a range of EDOF in advance, and then half-press a shutter. It is assumed that the user input unit 902 always stores the EDOF range that is most recently specified by the user. An input method to specify the EDOF range is not particularly designated.

When the user half-presses the shutter, the user input unit 902 detects that the shutter is half-pressed. Then, the user input unit 902 detects the angle of view, at that time, that is specified by the user, to determine the focal length. It should be noted that there are various means as input means for allowing the user to determine the angle of view, and examples of which include means operating a zoom ring attached to the lens barrel and operating a zoom lever attached to a camera body. Information on the determined focal length is passed to the camera control unit 903. It should be noted that the above does not apply to the case where the camera is a fixed focus camera.

Figure 4:
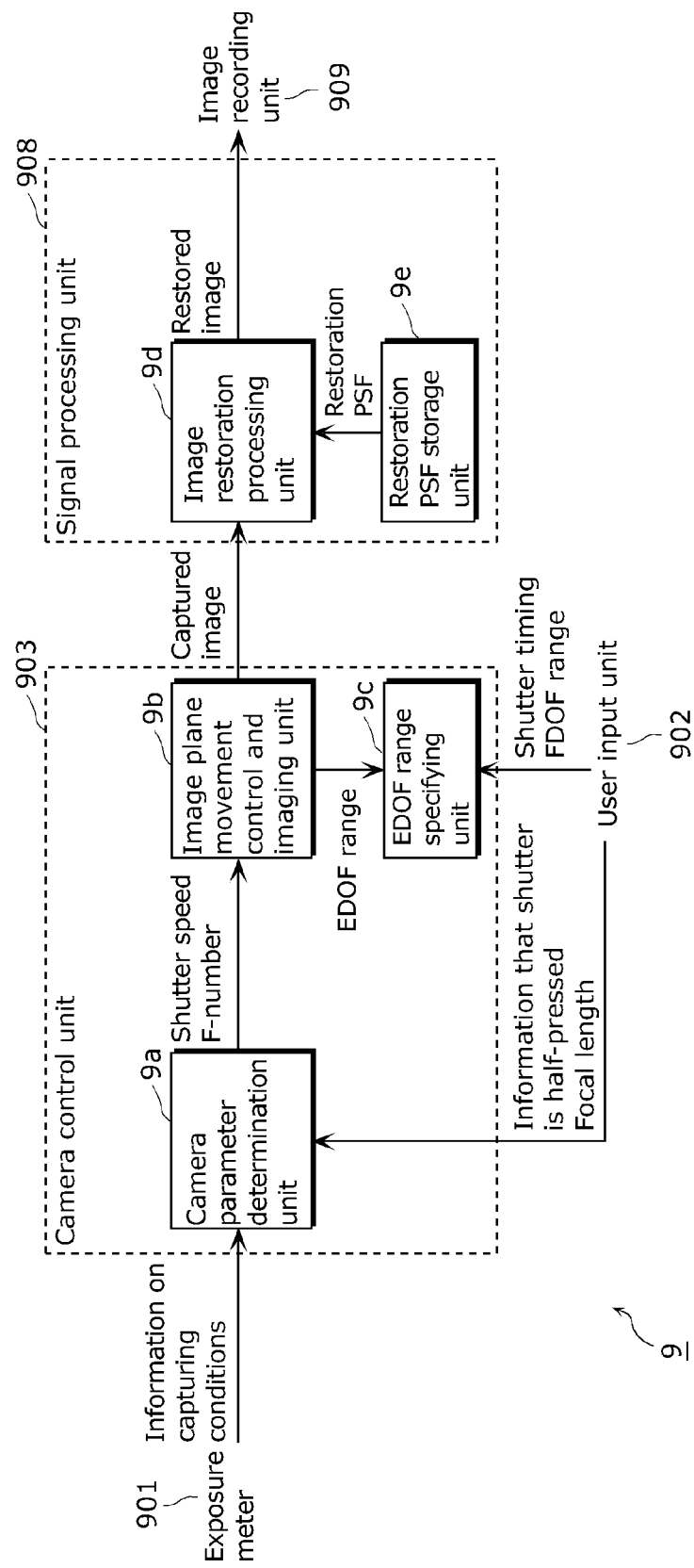

FIG. 4 is a diagram showing an example configuration of the camera control unit 903 and the signal processing unit 908 in detail.

The exposure meter 901 receives (information indicating) capturing conditions sensed. The camera parameter determination unit 9a determines appropriate camera parameters for the capturing conditions. The camera parameters include the shutter speed, the F-number, and the ISO speed. It should be noted that in the case of manual exposure, candidates, for the camera parameters, which correspond to exposure presented by the exposure meter 901 are presented to the user, and input for determining the camera parameters is performed by the user using the user input unit 902.

Then, when it is detected that the shutter is depressed by the user, the EDOF range specifying unit 9c reads out the stored EDOF range to make final determination of an actual EDOF range.

Then, the image plane movement control and imaging unit 9b performs the following control, based on the information on the shutter speed and F-number that are determined by the camera parameter determination unit 9a and the information on the EDOF range that is determined by the EDOF range specifying unit 9c. In the control, the image plane movement control and imaging unit 9b instructs the aperture 905 to operate at the F-number and instructs the shutter 906 to operate at the determined shutter speed. The image plane movement control and imaging unit 9b instructs the imaging device 907 to take an image according to this, in a manner in which the in-focus position moves in the determined EDOF range within the determined shutter speed.

It should be noted that what is moved during the exposure time may not be the imaging device 907 and may be a focus lens group forming a portion of the lens 904, so long as the control is made so that the moving distance of the focus position on the image plane side varies at substantially equal speeds. It should be noted that in the case of moving the imaging device 907, the moving distance of the focus position and the moving distance of the imaging device 907 match. In contrast, in the case of moving the focus lens group, it should be noted that the moving distance of the focus position and the moving distance of the focus lens group do not always match. Since the relationship can uniquely be determined by lens design data, information on the relationship is obtained in advance.

After imaging, the image plane movement control and imaging unit 9b transmits the captured image to the image restoration processing unit 9d. The image restoration processing unit 9d reads out pre-stored restoration PSF from the restoration PSF storage unit 9e. Then, the image restoration processing unit 9d performs the image restoration process on the captured image, using the read out restoration PSF, to generate an all-in-focus image. The image restoration process is processing by Richardson-Lucy method or Wiener filter method, for example.

Specifically, the blur pattern caused by the focus movement is measured or obtained by simulation, in advance. The blur pattern is stored as PSF data in the restoration PSF storage unit 9e. In addition to Wiener filter method and Lucy-Richardson method that are described above, various methods are known as the method for use in the image restoration process, and any method may be employed. An image recording unit 109 stores therein restored image signals as imaging data.

As described above, among various EDOF methods, the FDOF method is promising for use in digital still cameras. On the other hand, for these cameras, the zoom function is significantly important. While there are a digital zoom in which a captured image itself is enlarged or reduced and an optical zoom in which the focal length is changed by lens arrangement control, the optical zoom is basically common that causes relatively low degradation of the image quality. Changing the focal length in the optical zoom changes the depth of field itself. Here, it is assumed that f indicates the focal length, $F_{no}$ indicates an F-number of the lens, and $\epsilon$ indicates a permissible circle of confusion. It should be noted that the permissible circle of confusion $\epsilon$ can be regarded as a cell pitch size of the imaging device when considering a case where an image captured by a digital camera is shown in pixel-to-pixel. It should be noted that in this case, it is specified that "no blur occurs in any pixel in focus". It is known that the relationship indicated by the following Equation 1 is satisfied:

Equation 1:

$$MOD = \frac{f^2}{2F_{no}\varepsilon} \quad (1)$$

where MOD represents the end of depth of field closer to the user when the end of depth of field farther to the user is positioned at infinity.

Figure 5:
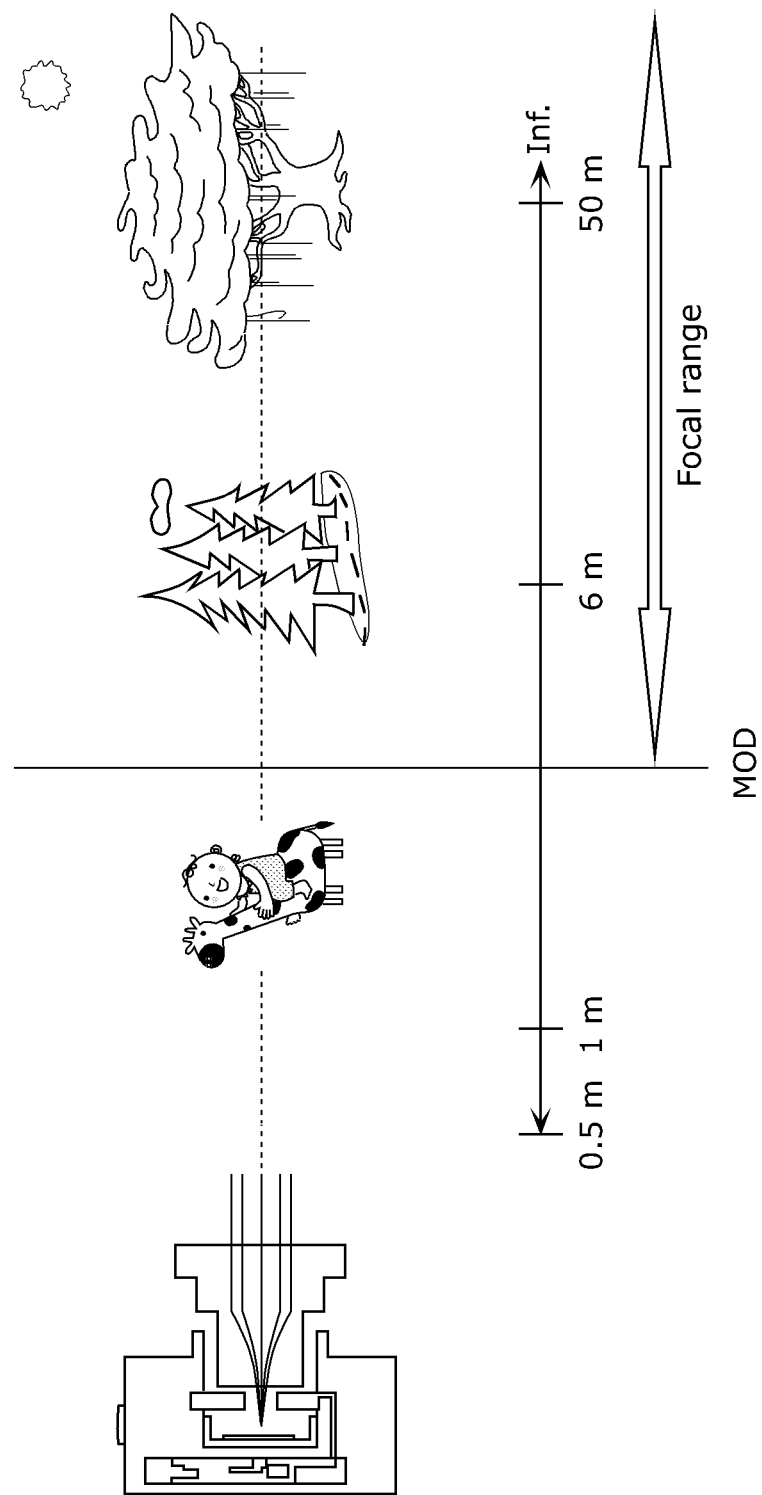
FIG. 5 is a diagram defining a focal range and an MOD (Minimum Object Distance) which is a front end of DOF.

FIG. 5 is a diagram defining the focal range and the MOD (Minimum Object Distance) which is the front end of DOF.

A specific image is as shown in FIG. 5. Here, ε is determined based on a type of camera, the F-number $F_{no}$ is determined based on image-capturing conditions such as brightness and the subject. Here, it can be seen that when the focal length f changes (synonymous with that the angle of view changes) according to a user's intention of taking images, the MOD also changes.

Usually, when the focal length f is a certain value and the user attempts to obtain an MOD desired by the user, it is common that a user or the camera changes the F-number $F_{no}$, according to the relationship indicated by Equation 1. However, user needs exist that the user wishes to obtain the desired MOD without changing $F_{no}$, i.e., wishes to freely set $F_{no}$, irrespective of the desired MOD, based on conditions such as the speed of the subject and brightness, as described in the Background Art section.

In general, it is known that in the EDOF, the greater the range of depth of field is extended and the greater the amount of extension of depth of field (the width of extended depth of field) is, the greater the EDOF is subjected to the effect by noise. In other words, the amount of extension of depth of field and the S/N ratio (image quality) of the image is in trade off. Thus, the greater the amount of extension of depth of field is, the lower the image quality is.

In the EDOF that employs WFC, CA, lens chromatic aberration system, or multifocal lens system, the EDOF effect is achieved by devising the optical element. Thus, the EDOF range cannot be freely changed according to a request by the user. On the other hand, the width of extended depth of field can be kept at a certain degree determined in design.

On the other hand, the FDOF, unlike the other methods, has flexibility of freely changing the EDOF range. However, it is required that the width of extended depth of field is set taking into account the trade-off as mentioned above, so that the S/N ratio (the image quality) is not too low. In other words, there are constraints.

In addition to this, constrains specifically related to the FDOF is the actuator performance. The FDOF requires for fast sweep drive during the exposure time. The constraints can vary depending on the performance of the actuator.

Furthermore, while it is desirable that the control is performed taking the constraints into account, to situationally restrict the EDOF range, no literature has previously discussed what user interaction to restrict the EDOF range is accepted by a user without causing any discomfort.

The above-mentioned imaging apparatus according to one aspect of the present invention is to solve the foregoing problems. In other words, according to the imaging apparatus, the EDOF range can be restricted in a non-obstructive manner by the F-DOF through interaction with a user.

Moreover, according to the imaging apparatus, in the imaging apparatus employing a method for achieving the extended depth of field, an effective and failure-free extended depth of field can be achieved even when the focal length is changed.

Moreover, according to the configuration of the imaging apparatus, change in the necessary constraints can be taken into account when capturing an image having a different focal length, and thus, for example, the extended depth of field can be achieved by the FDOF even in an imager having the zoom function.

Moreover, according to the configuration of the imaging apparatus, in addition to the above-described effects, the depth of field can be extended so that an object desired by the user to be in focus is included therein.

Moreover, according to the configuration of the imaging apparatus, a sharp image in which the depth of field is extended can be outputted from the imaging apparatus.

Moreover, according to the imaging apparatus, when capturing an image using an imager having a zoom function a focal length of which is changeable, the extended depth of field can be achieved by the FDOF by a control taking the change in necessary constraints into account.

Hereinafter, embodiments of the present invention will be described with accompanying drawings. It should be noted that the embodiments described below are each merely an illustration of the present disclosure. Values, shapes, materials, components, disposition or a form of connection between the components, steps, and the order of the steps are merely illustrative, and are not intended to limit the present disclosure. Moreover, among components of the below non-limiting embodiments, components not set forth in the independent claims indicating the top level concept of the present disclosure will be described as optional components.

Embodiment 1

An imaging apparatus according to an embodiment 1 of the present invention will be described with reference to FIGS. 6 to 15.

Figure 6:
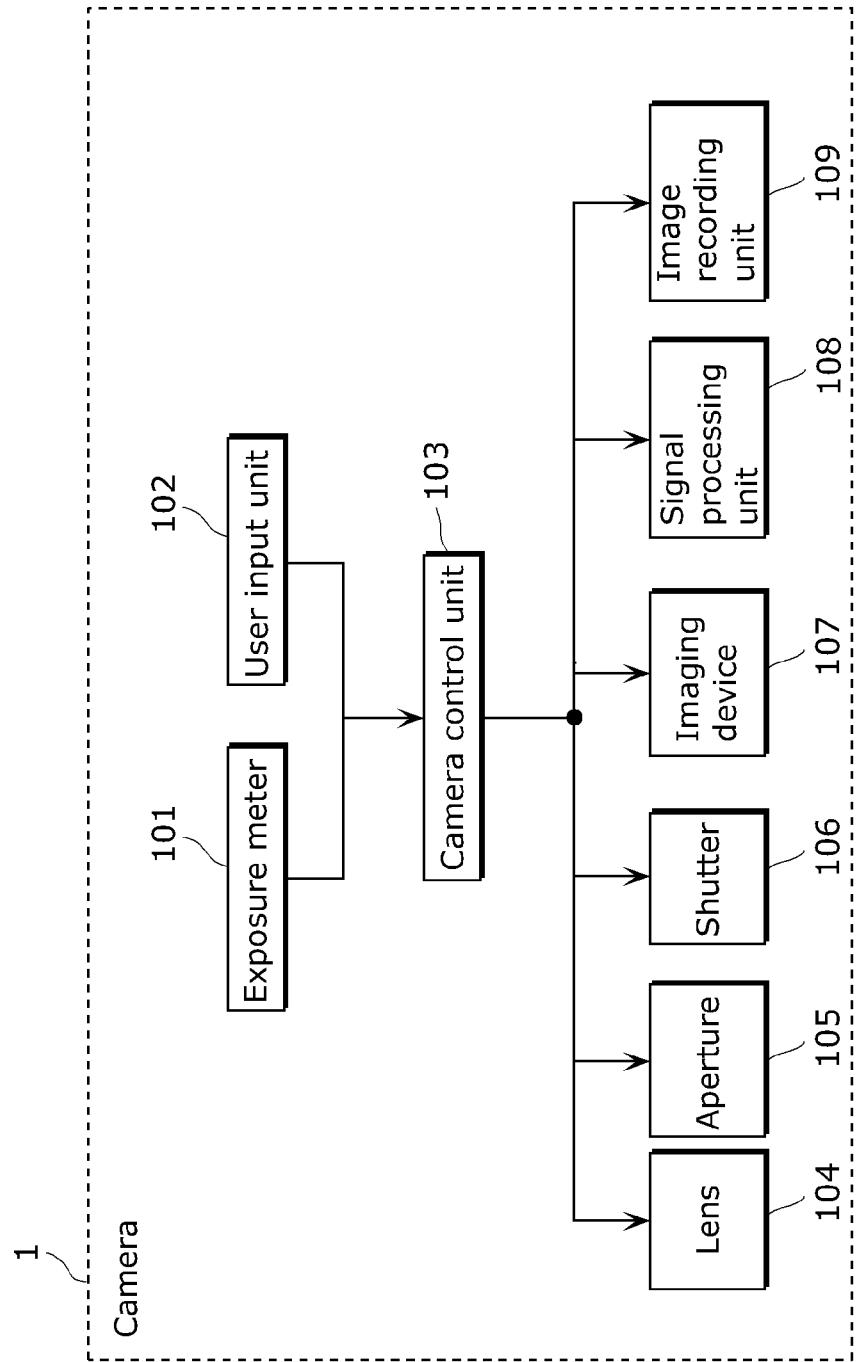
FIG. 6 is a block diagram of an imaging apparatus according to an embodiment 1.

FIG. 6 is a diagram showing a basic configuration of a camera (an imaging apparatus) 1 according to the embodiment 1.

The basic configuration of the camera 1 shown in FIG. 6 is the same as the configuration of the camera 9 mentioned above and is according to FIG. 3. It should be noted that description of the same features of the camera 1 as those of the camera 9 will be omitted as appropriate.

Figure 7:
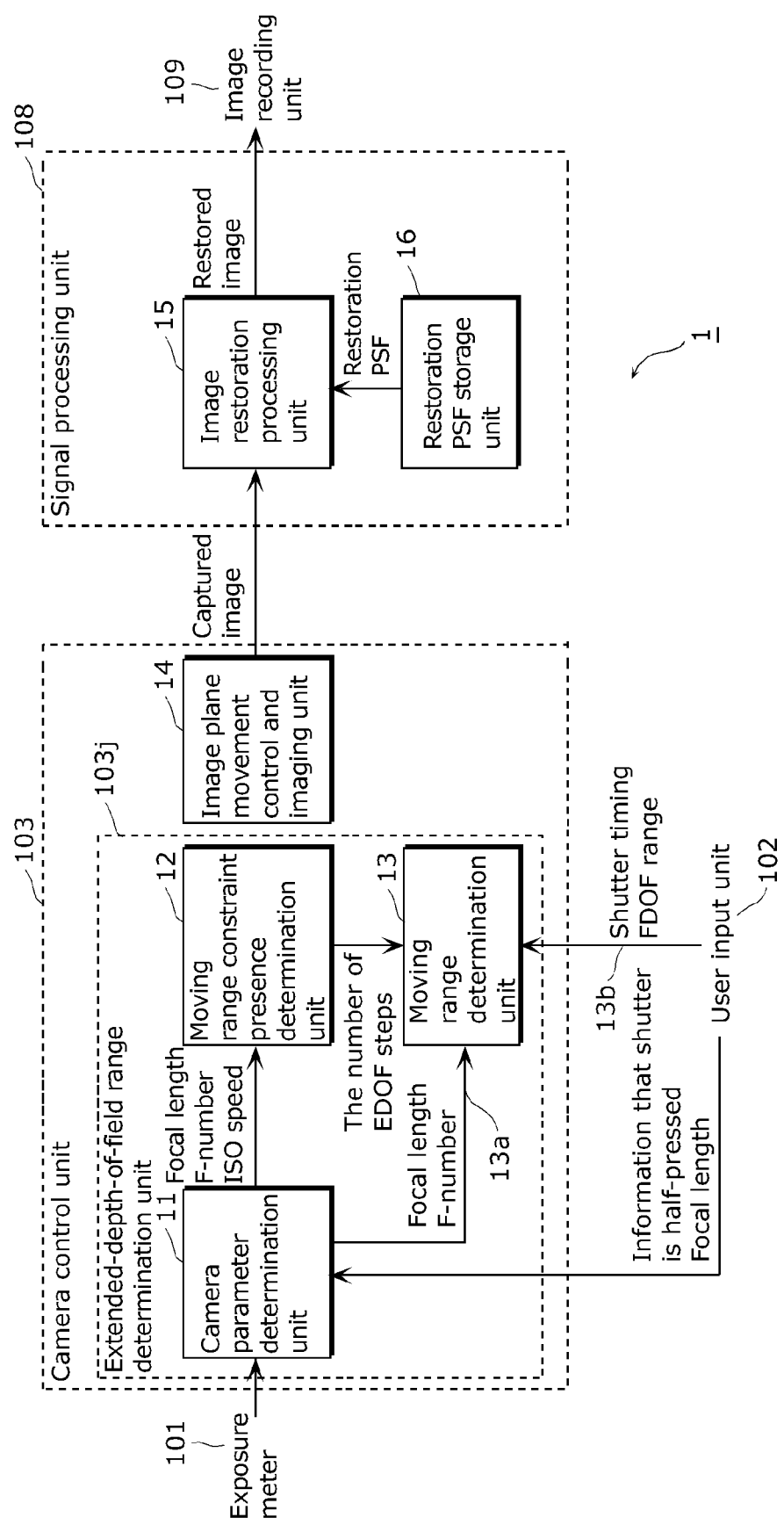

FIG. 7 is a diagram showing a specific configuration of a camera control unit 103 according to the embodiment 1.

The camera control unit 103 includes an extended-depth-of-field range determination unit 103j which includes: a camera parameter determination unit 11; a moving range constraint presence determination unit 12; and a moving range determination unit 13, and an image plane movement control and imaging unit 14. It should be noted that a specific configuration and operation of a signal processing unit 108 is according to the description of the configuration and operation of the signal processing unit 908 shown in FIG. 4.

The camera parameter determination unit 11 receives (information on) the capturing conditions obtained using an exposure meter 101, and determines appropriate camera parameters, in accordance with the capturing conditions. Here, the camera parameters include the focal length, in addition to the shutter speed, the F-number, and the ISO speed. The focal length is designated via a user input unit 102. Other features of the camera parameter determination unit 11 are according to the description of the camera parameter determination unit 9a shown in FIG. 4 mentioned above.

Then, when it is detected that the shutter is depressed by a user, the moving range constraint presence determination unit 12 determines the presence of constraints with respect to a range in which the focus position (for example, a position of an imaging device) is to be moved, based on information on the focal length, the F-number, and the ISO speed outputted from the camera parameter determination unit 11 and based on a decision flow described below.

The moving range determination unit 13 determines the moving range of the focus position, based on the constraints determined by the moving range constraint presence determination unit 12. Specifically, the moving range determination unit 13 determines how much an imaging device 107 or a portion (such as the focus lens group) of a lens 104 is to be moved, and determines the moving range.

It should be noted that as set forth in the description of the camera 9 mentioned above, in the case of moving the imaging device 107, the moving distance of the focus position on the image plane side and the moving distance of the imaging device 107 on the image plane side match. In contrast, in the case of moving the focus lens group, it should be noted that the moving distance of the focus position and the moving distance of the focus lens group do not always match. Since the relationship can uniquely be determined by lens design data, information on the relationship is obtained in advance.

Based on the information on the shutter speed and F-number that are determined by the camera parameter determination unit 11 and the information on the moving range, of the focus position, that is determined by the moving range determination unit 13, the image plane movement control and imaging unit 5 causes the camera 1 to capture an image, instructing the aperture 105 to operate at the determined F-number, instructing a shutter 106 to operate at the determined shutter speed, and instructing the imaging device 107 (such as an actuator for driving the imaging device 107) to move at the determined shutter speed in the determined moving range.

It should be noted that the portion to be moved during the exposure time may not be the imaging device 107 and may be the focus lens group which forms a portion of the lens 104, as described above. The control is made so that the moving distance of the focus position on the image plane side varies at substantially equal speeds.

Hereinafter, the decision flow, executed by the moving range constraint presence determination unit 12, for determining the presence or absence of constraints on the moving range, in which the focus position is moved, will be described.

Usually, when the focal length f is a certain value and the user attempts to obtain an MOD desired by the user, it is common that a user or the camera changes the F-number $F_{no}$, according to the relationship indicated by the following Equation 2. However, user needs exist that the user wishes to obtain the desired MOD without changing $F_{no}$, i.e., wishes to freely set $F_{no}$, irrespective of the desired MOD, based on conditions such as the motion speed of the subject and brightness, as set forth in the description above.

Here, the end of depth of field closer to the user, $MOD_{EDOF}$, obtained by extending the depth of field by the EDOF can be described by the following equation:

Equation 2:

$$MOD_{EDOF} = \frac{f^2}{2^{\frac{N}{2}+1} F_{no} \varepsilon} \quad (2)$$

where the F-number $F_{no}$ of the lens is set by a user, according to image-capturing situation, and N is a number indicative of an extension step of the depth of field. It is assumed, here, for convenience, that N will be referred to as the number of EDOF steps. As such, $MOD_{EDOF}$ (f, N)=$MOD_{EDOF}$ (f, 0)/2^(N/2)=MDOF (f)/2^(N/2)=, where a^b indicates a to b-th power.

Figures 8, 9:
FIG. 8 is a diagram showing a relationship between an aperture, the front end of DOF (MOD), and the image-plane-side distance under certain camera conditions.
FIG. 9 is a diagram schematically representing through-focus characteristics obtained by the common camera.

FIG. 8 shows a diagram illustrating the relationship between the number of EDOF steps N and $F_{no}$.

The relationship is defined as a relationship indicated on the left two columns of the figure. For example, when the depth of field equivalent to that at F 90.5 is obtained by the EDOF with respect to the depth of field obtained at F2.8, the EDOF effect is represented as effects equivalent to 10 steps obtained by subtracting 3 from 13.

As such, the number of EDOF steps N is equivalent to the number of stops, and means that the effects equivalent to the extended depth of field obtained by stopping down the aperture by N steps is obtained by the EDOF without actually stopping down. N=0 is satisfied when the depth of field is not extended (see MOD=$MOD_{EDOF}$ (f, 0) mentioned above), and N is a positive number when the depth of field is extended. In other words, a distance to the end of depth of field closer to the user after the depth of field is extended satisfies, as mentioned above, $MOD_{EDOF}$ (f, N)=$MOD_{EDOF}$ (f, 0)/2^(N/2). $MOD_{EDOF}$ (f, 0) in the equation is a distance to the end of depth of field closer to the user when the depth of field is not extended where N=0. In other words, the distance to the end of depth of field closer to the user is a distance multiplied by ½^(N/2) by the extended depth of field to be shortened to ½^(N/2). Thus, the distance is shortened by a shortening that is determined to be ½^(N/2) by N.

It can be seen that newly adding a variable N enhances the flexibility in setting f, $F_{no}$, and $MOD_{EDOF}$ in Equation 3. It should be noted that MOD ($MOD_{EDOF}$) when the focal length f is 18 mm and the cell size (permissible circle of confusion) of the imaging device is 1.5 um is indicated in the third column of the table shown in FIG. 8. Here, it is known that the following Equation 3 is satisfied through the lens formula:

Equation 3:

$$\frac{1}{f} = \frac{1}{u} + \frac{1}{v} \quad (3)$$

where f represents the focal length, of the lens, satisfying the relationship shown in FIG. 1 with respect to the subject-side-distance u and the image-plane-side distance v.

The moving distance $\Delta v_{NLim}$ of the in-focus position on the image plane side from MOD to infinity can be described as follows, using Equation 3:

Equation 4:

$$\Delta v \leq \Delta v_{NLim} = \frac{2^{\frac{N}{2}+1} F_{no} f \varepsilon}{f - 2^{\frac{N}{2}+1} F_{no} \varepsilon} \quad (4)$$

where $\Delta v$ (the first equation of Equation 4) represents a resulting moving distance of the in-focus position, and indicates the extent of the moving range of the in-focus position determined by the moving range determination unit 13. Thus, the moving range determination unit 13 determines a value no greater than the upper bound (the second upper bound) represented by $\Delta v_{NLim}$ in Equation 4 as the extent of the moving range to which the in-focus position is to be moved.

The fourth column in the table shown in FIG. 8 indicates values of distances ($\Delta v_{NLim}$) obtained by converting, by Equation 4, distances from $MOD_{EDOF}$ to infinity on the subject side, which are indicated in the third column of the table, into image-plane-side distances corresponding to the distances. In the case of the F-DOF, the number of steps N mentioned above limits the value of $\Delta v_{NLim}$, serving as an amount of movement (variable) of Equation (the third equation of Equation 4) for the moving distance $\Delta v_{NLim}$ on the image plane side, and, in its turn, limits and controls the extent $\Delta v$, of the moving range, to be determined.

Here, $\Delta v_{NLim}$ described above increases as N increases. In other words, when the numerator and denominator of the third equation of Equation 4 are each divided by 2^(N/2), $\Delta v_{NLim}$ is represented as satisfying $\Delta v_{NLim}=A/(B/2^{(N/2)}-C)$. Thus, as N increases, the denominator $(B/2^{(N/2)}-C)$ of the equation decreases and the value (value of $\Delta v_{NLim}$) increases.

On the other hand, in general, the greater the above described Δv is and the greater the width of extended depth of field (the amount of extension of depth of field) is, the greater the effect by the EDOF is enhanced and the greater the number of subjects at positions on the subject side is focused, while a relative amount of noise to the luminance of the subject increases and the S/N ratio decreases.

FIG. 9 is schematic illustration of the depth of field, i.e., the focal range at normal image capturing, and is a diagram showing characteristics known as the through-focus characteristics.

The sharpness (image sharpness) is represented on the vertical axis, using MTF (Modulation Transfer Function) in general.

The image-plane-side distance (see v shown in FIG. 1) is indicated on the horizontal axis. The image-plane-side distance is inverted, based on the relationship (Equation 3) between u and v shown in FIG. 1 (see that the greater v is, the smaller u is in Equation 3) and rescaled, thereby a distance (u) between the imaging apparatus and the subject is obtained.

In the case of normal image capturing without the movement of image plane during exposure, in general, when the focus is in a portion at a certain subject distance, a greatest sharpness is obtained at the portion. In other words, in portions in front of and behind the portion at the subject distance, the farther the each of the portions is away from the portion in focus, the greater the sharpness is lost.

Figure 10:
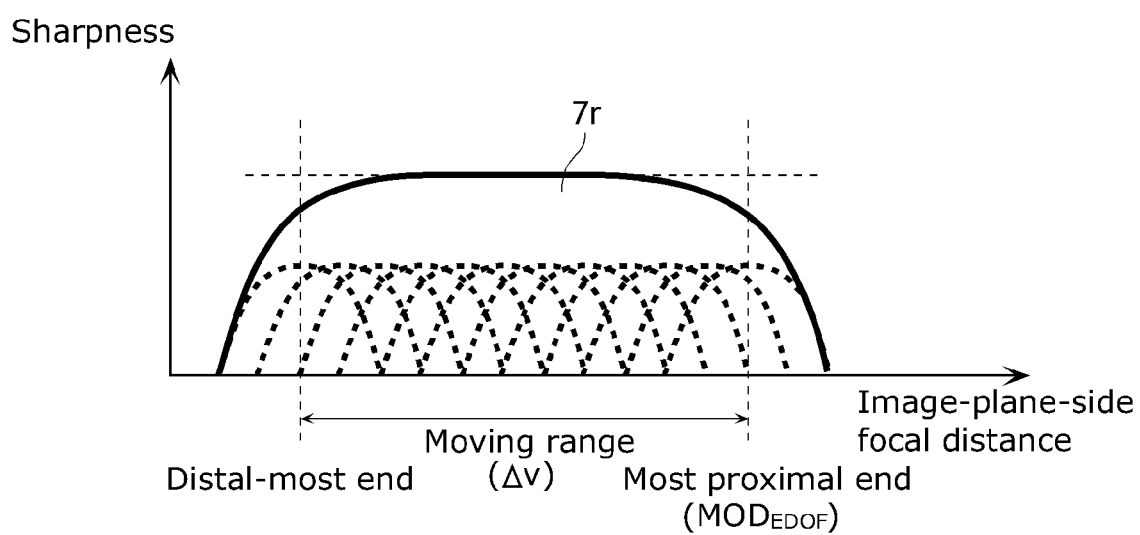
FIG. 10 is a diagram schematically representing the through-focus characteristics when a focus position is moved by a focus lens of the camera or movement of the imaging device.

FIG. 10 is a diagram schematically illustrating the through-focus characteristics when the movement is performed at equal speeds during exposure.

Dotted lines represent a state in which data of the through-focus characteristics at normal image-capturing represented by the schematic view shown in FIG. 9 is moved on the horizontal axis in a range from a distance on the leftmost side, which corresponds to a position at the distal-most end on the subject side, to a distance on the rightmost side which corresponds to the most proximal end. For example, NPL 3 indicates that the through-focus characteristics indicated by a solid line obtained as a result of the movement are obtained by integration of the dotted lines.

Originally, when an image is captured under the same conditions, the amount of received energy at the image-capturing is constant. Thus, the integral indicated by the solid line in FIG. 9 and the integral indicated by a solid line in FIG. 10 should be equivalent. Therefore, the height of the maximum value of the solid line shown in FIG. 10 is relatively lower than the height of the maximum value shown in FIG. 9. In other words, in the case of FIG. 10, a uniformly blurred image is obtained, and by later performing the image restoration process, the same MTF value as that when in focus as shown in FIG. 9 is obtained. Here, noise is also amplified. The greater the amount of image plane movement is, the lower the height of the maximum value of the solid line shown in FIG. 10 is, the greater the amount that needs be increased by the image restoration process, and the greater the noise is amplified. As described above, the amount of EDOF (see Δv described above) and the degradation in image quality are in trade off. Thus, it is required that the amount of EDOF (Δv) is constrained in accordance with the desired quality of image (see N and so on mentioned above), so that the quality of image is met. For this reason, constrains shown in the above-mentioned Equation 4 are set, and the upper bound ($\Delta v_{NLim}$, the second upper bound) is set in accordance with the value of N.

Moreover, in the F-DOF, it is required that the imaging device or the focus lens is moved during exposure. Therefore, as mentioned above, the drive performance of the actuator is also a problem. In other words, the greater the amount of movement is, the greater the distance of movement per unit time increases. Thus, high-speed movement is required and acceleration and deceleration until reaching a target speed also increase. This in turn requires the drive performance of the actuator that enables such high-speed movement. Employment of a predefined actuator, of course, requires that the upper bound corresponding to the drive performance of the actuator is set for the amount of image plane movement (Δv) which is the amount of movement at the focus position. For example, the following Equation 5 need be satisfied:

Equation 5:

$$\Delta v \leq \Delta v_{ActLim} \quad (5)$$

where $\Delta v_{ActLim}$ uniformly represents the maximum moving distance on the image plane side.

It should be noted that as described above, when moving the imaging device 107, the maximum moving distance determined by a permissible drive performance of the actuator is $\Delta v_{ActLim}$ as it is. On the other hand, when moving the portion (for example, the focus lens group and so on) of the lens 104, the maximum moving distance determined by the permissible drive performance of the actuator is specified as the moving distance of the focus lens group and so on. From this, it is necessary, in this case, that the maximum moving distance $\Delta v_{ActLim}$ is converted, in advance, into the moving distance of the focus lens group and so on.

Here, it should be noted that the all-in-focus image need be defined. In other words, a width of depth of field necessary for an image to meet the definition and satisfy as being the all-in-focus image need be specified.

The term, the minimum object distance, in a general sense, as used herein means "a closest object-side distance that can be focused using the lens." An image focused at any distance between the minimum object distance and infinity is, here, referred to as "all-in-focus image" in a broad sense. In this case, to what extent, what is called a macro region which is a region for a relatively-close-object-side distance (the subject side distance) is supported depends on an optical design, and may or may not change due to the focal length.

Assuming such image-plane-side distance from the minimum object distance to infinity as $\Delta v_{AIF}$, the following Equation 6 need be satisfied:

Equation 6:

$$\Delta v \leq \Delta v_{AIF} \quad (6)$$

FIG. 11 is a diagram showing distances k and d to an object, the angles of view $\theta_0$ and θ, and a size p of objects.

Alternatively, when defining the all-in-focus image, the following reasoning also holds.

In other words, in an upper figure shown in FIG. 11, the object having the size p at the distance k is imaged to a predetermined size (a size x shown in FIG. 12 described below) on the imaging device, having a focal length that forms the angle of view $\theta_0$. In contrast, in a lower figure, the object having the same size p at the distance d is imaged to the above-described predetermined size, having a focal length f that forms the angle of view θ. Conditions of the distance d is considered whereby the size to which the object is imaged is kept unchanged at the above-described predetermined size even when the focal length changes from the focal length that forms the angle of view $\theta_0$ to the focal length f that forms the angle of view $\theta$.

It should be noted that, assuming a defined range of the all-in-focus image in a standard angle of view (equivalent of 50 mm on the scale of 35 mm) as, for example, from 1 m to infinity, one end closer to the user in the range from 1 m to infinity is 1 m. For example, the angle of view $\theta_0$ described above is the standard angle of view, and the distance k described above is the above-described 1 m in the standard angle of view.

In other words, it is considered that the one end closer to the user in the defined range of the all-in-focus image is changed according to the above-mentioned conditions and regarded as the distance d satisfying the above-mentioned conditions.

An image having the defined range from the distance d to infinity will be referred to as "all-in-focus image" in a narrow sense.

The above-described condition of the distance d which is a condition for the sizes, to which two objects having the same size p are imaged, to remain unchanged even when the focal length is changed, is as shown in Equation 10 below that the distance d is proportional to the focal length f, which will be described, hereinafter, with reference to FIGS. 11 and 12.

An upper figure in FIG. 11 shows a case where the object that has the size p and forms the angle of view $\theta_0$ is captured at a location by a distance k away. It should be noted that the object is a target object an image of which to be captured is a bust shot of the person such as from the chest to the top of the head of a person. The size p described above is, for example, about 60 cm from the chest to the top of the head of the person.

A lower figure in FIG. 11 shows a case where the object that has the same size p and forms the angle of view $\theta$ is captured at a location by a distance d away.

The case of the upper figure satisfies the relationship of the following Equation 7:

Equation 7:

$$p = 2k \tan\frac{\theta_0}{2} \quad (7)$$

The case of the lower figure satisfies a relationship of the following equation:

Equation 8:

$$p = 2d \tan\frac{\theta}{2} \quad (8)$$

These two equations that are Equation 7 and Equation lead to the following Equation 9 by eliminating p in Equation 8:

Equation 9:

$$d = \frac{k \tan\frac{\theta_0}{2}}{\tan\frac{\theta}{2}} \quad (9)$$

Furthermore, as shown in FIG. 12, the relationship between the size x of the imaging device, the focal length f, and the angle of view $\theta$ satisfies the following Equation 10:

Equation 10:

$$\tan\frac{\theta}{2} = \frac{x}{2f} \quad (10)$$

Equation 10 is substituted into Equation 9 to obtain the following Equation 11:

Equation 11:

$$d = \frac{2kf}{x} \tan\frac{\theta_0}{2} \quad (11)$$

It should be noted that, thus, the following is satisfied; the distance $d=(2k\times\tan(\theta_0/2)/x)\times f=A\times f$ (where $A=2k\times\tan(\theta_0/2)/x$).

Here, the size x of the imaging device is a constant determined by a type of imaging device provided to the camera. As mentioned above, when the defined range of the all-in-focus image in the standard angle of view $\theta_0$ is, for example, 1 m to infinity, the standard angle of view $\theta_0$ is 43.27 degree and k=1 m, where $\theta_0$ and k are both constants. Therefore, A described above is a constant, leading the above-described relationship $d=A\times f$ where the distance d changes in proportional to the focal length f. It should be noted that, for example, when f=25 mm on the scale of 35 mm in Equation 11, an image in which any points in the range from 0.5 m to infinity are in focus is called the all-in-focus image.

A scaled distance $\Delta v_{AIF}=v(d)-v(\text{infinity})$ which a distance in the image plane side range corresponding to the subject side range from the distance d to infinity in Equation is represented by the following Equation 12 which is rearrangement of the above-mentioned Equation 3:

Equation 12:

$$\Delta v \leq \Delta v_{AIF} = \frac{xf}{2k \tan\frac{\theta_0}{2} - x} \quad (12)$$

As described above, the definition of the all-in-focus image may be changed depending on the application.

From the foregoing, the constraints on the moving range in which the focus position is moved is either the constraints by the three equations that are Equation 4, Equation 5, and Equation 6, or the constraints by the three equations that are Equation 4, Equation 5, and Equation 12. It should be noted that there are two combinations of three equations. In each combination, all the three equations of the combination need be satisfied.

It should be noted that, here, $F_{no}$ is included in Equation 4. In general, changing the focal length f means the use of zoom lens. On the other hand, some zoom lens changes $F_{no}$, in accordance with change of the focal length f. In this case, the relationship between the focal length f and $F_{no}$ is uniquely determined by specification of lens predetermined by design. Therefore, the relationship may be reflected in Equation 4.

As described above, the moving range constraint presence determination unit 12 can determine the presence or absence of constraints on the moving range in which the focus position is moved.

Figure 13:
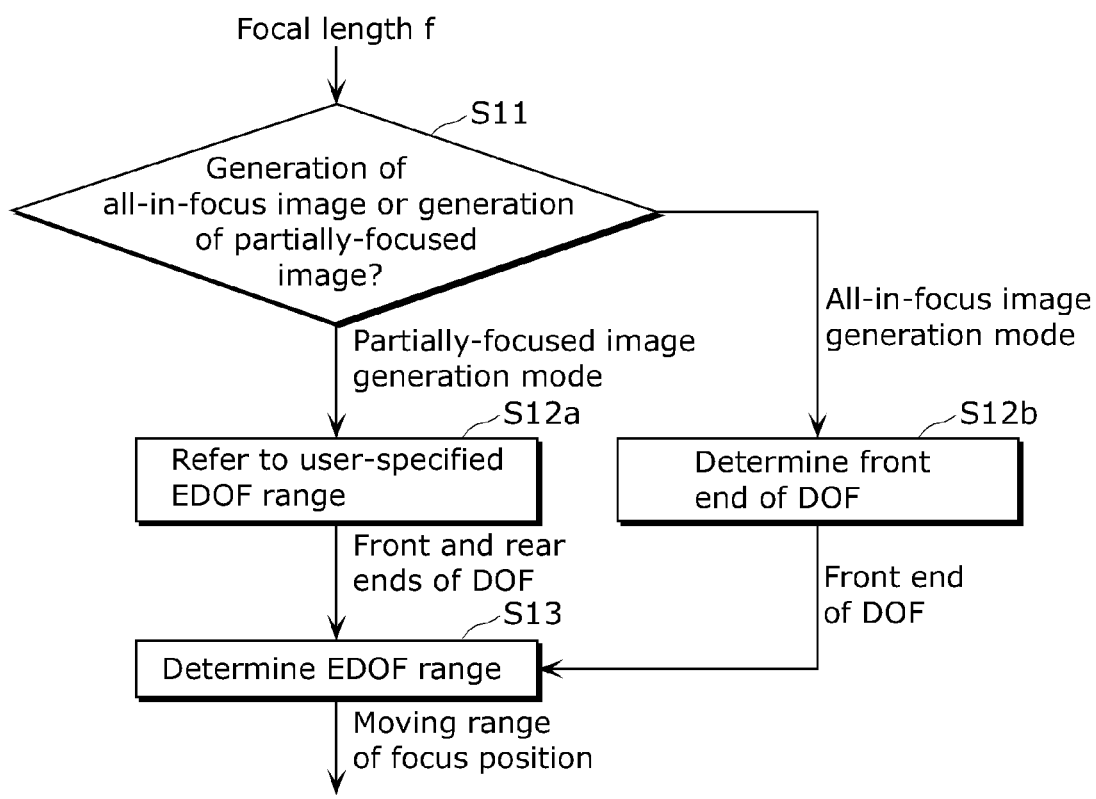
FIG. 13 is a flowchart illustrating a processing flow when determining a moving range of the focus position in the embodiment 1.

FIG. 13 is a flowchart illustrating a processing flow when determining the moving range of the focus position in the embodiment 1 of the present invention.

Next, processing steps performed by the moving range determination unit 13 will be described in accordance with the processing flow illustrated in FIG. 13. As described above, the moving range determination unit 13 first determines Δv that satisfies all the three equations.

Next, the moving range determination unit 13 determines whether Δv has been determined based on Equation 4 or Equation 5, or based on Equation 6 or Equation 12 (S11).

When it is determined that Δv has been determined by Equation 4 or Equation 5 ("Partially-focused image generation mode" in S11), which means that moving action for performing the generation of the definitional all-in-focus image cannot be carried out. Thus, the processing transitions to the processing in the partially-focused image generation mode (S12*a*) in the flowchart illustrated in FIG. 13.

When it is determined that Δv has been determined by the latter Equation 12 or the like ("All-in-focus image generation mode" in S11), the processing transitions to processing in the all-in-focus image generation mode (S12*b*). Different modes have different operations, and thus the modes will be described below in two parts.

First, when the processing transitions to the processing in the partially-focused image generation mode (S12*a*), the moving range determination unit 13 needs to determine a portion to be moved of the moving range (a range having the dimension $\Delta v_{AIF}$) used for performing the generation of the definitional all-in-focus image. In other words, a range of the portion is specified.

For example, it is assumed that the focal length is 20 mm and the defined range of the all-in-focus image is from 1 m to infinity.

Here, the image-plane-side moving distance "v (1 m)–v (infinity)" is a distance from a principal point location behind the lens to a range between 20.408 mm and 20.000 mm, i.e., 20.408 mm–20.000 mm=408 um.

Furthermore, it is assumed that the smallest upper bound among the upper bounds Δv such as $\Delta v_{AIF}$ in Equation 12 and $\Delta v_{NLim}$ in Equation 4 that are specified by the moving range constraint presence determination unit 12 is 300 um (<408 um).

Here, the moving range determination unit 13 determines a portion of the subject side range from 1 m to infinity as the portion (service area) described above.

Here, the user is allowed to specify the EDOF range, i.e., the moving range.

A block, "Refer to user-specified EDOF range", (S12*a*) shown in FIG. 13 is the block in which the EDOF range is specified.

In S12*a*, specifically, the moving range determination unit 3 receives from the user input unit 102 information on the EDOF range specified by user.

Next, processing performed in a block, "Determine EDOF range" (S13), shown in FIG. 13 will be described.

It is assumed that, for example, the range specified by input instructions from the user is from 2 m to 3 m. When the range is converted into the image plane side range by the above-mentioned Equation 3, a range obtained by the conversion is from v (2 m)=20.202 mm to v (3 m)=20.134 mm, i.e., merely the moving range of 20.202 mm–20.134 mm=0.068 mm=68 um.

Thus, margins are added below and beyond the range from 20.134 mm to 20.202 mm. A way of adding may be any and an example of which is that the moving range determination unit 3 evenly assigns margins below and beyond the range to determine a range from 20.202 mm–0.184 mm=20.018 mm to 20.134 mm+0.184 mm 20.318 mm as the moving range.

The subject side range in this case is from 1.28 m to 22.2 m in terms of the subject side range. It should be noted that the image-plane-side range which corresponds to the range specified by the user may be broader than Δv. In this case, a warning indication is given to the user to allow the user to modify the range while guiding the user. Alternatively, it is contemplated that only a portion including the central portion of the specified range is processed. In such a manner, the moving range determination unit 3 determines the actual EDOF range, i.e., the moving range of the focus position.

Next, when the processing transitions to the processing in the all-in-focus image generation mode, the moving range determination unit 3 determines the moving range used for generating the definitional all-in-focus image. Normally, the rear end of DOF is infinity, and thus, the moving range determination unit 3 may simply determine the front end of DOF. Specifically, when the focal length is 10 mm and the defined range of the all-in-focus image is from 1 m to infinity, the moving range on the image plane side, which is in terms of the image plane side by Equation 3 and based on the principal point location behind the lens, is from v (1 m)=10.101 mm to v (infinity)=10.000 mm. Thus, the moving distance is determined to be 10.101 mm–10.000 mm=101 um, thereby uniquely determining the moving distance.

Figure 14:
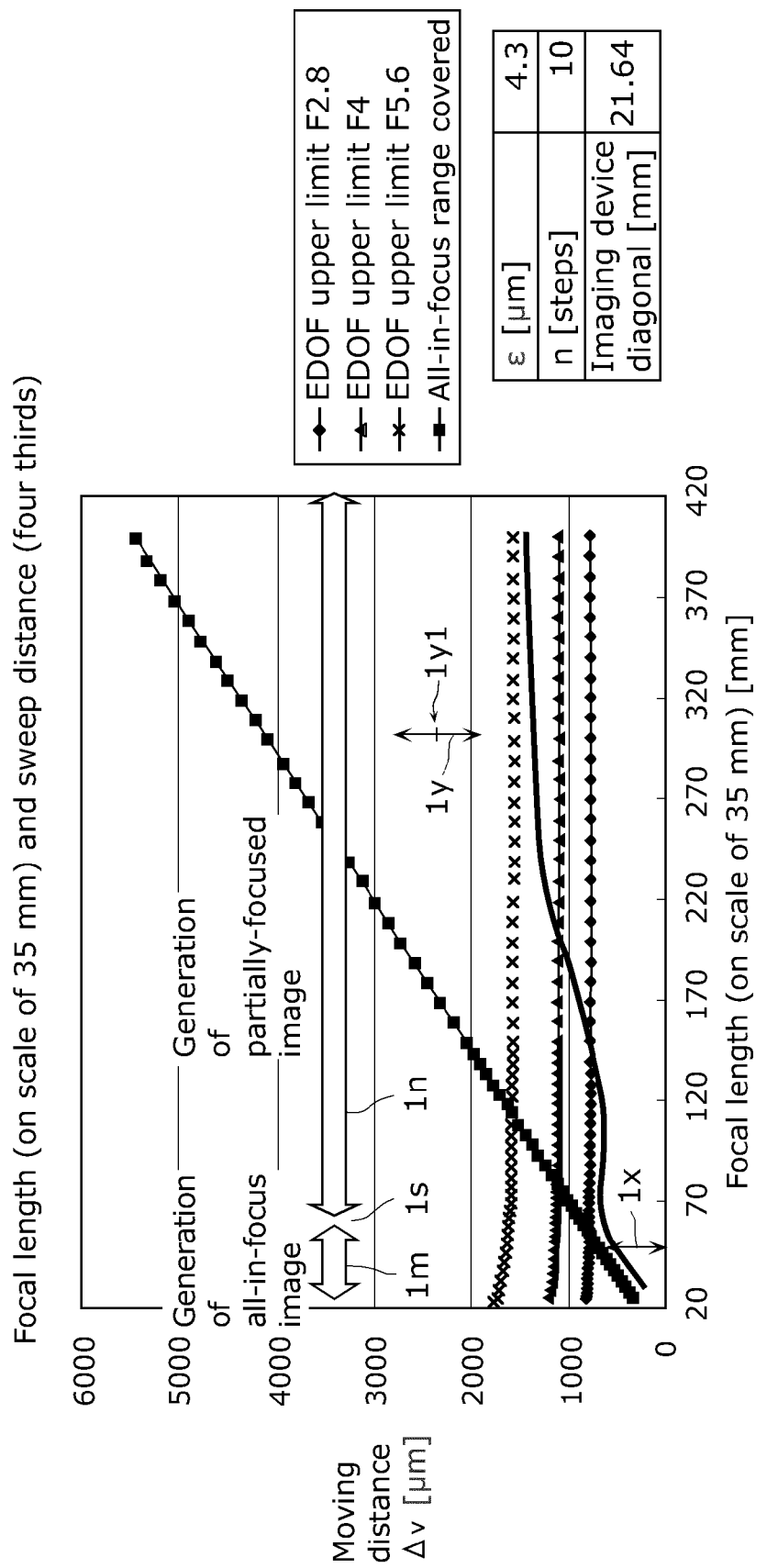
FIG. 14 is a diagram showing a relationship between the focal length and a moving distance of the focus position in the case of four thirds.
Figure 15:
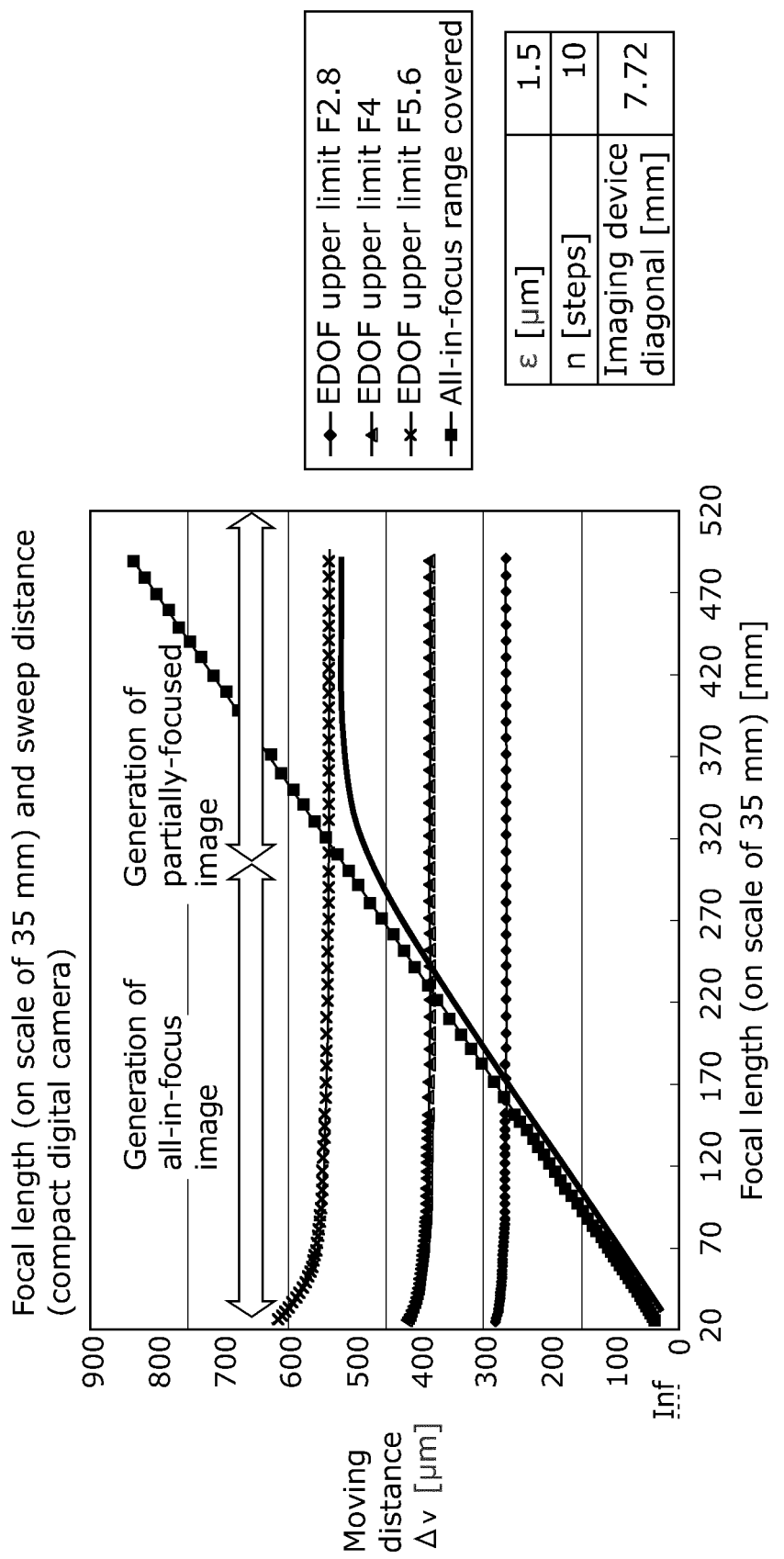
FIG. 15 is a diagram showing a relationship between the focal length and the moving distance of the focus position in the case of a typical compact digital camera.

FIG. 14 and FIG. 15 are diagrams illustrating the relationships between the focal length and the moving distance in conditions of four thirds and conditions of the compact digital camera, respectively.

The square points depict a graph obtained when all the focal points are covered. In other words, the square points correspond to the conditions of Equation 6 (Equation 12).

Meanwhile, the diamond points depict a graph of conditions determined by the upper bound of the number of steps of EDOF (F=2.8 and N=3), and correspond to the conditions of Equation 4.

A smaller value in the two graphs is the upper bound. From this, the processing is in the all-in-focus image generation mode for a portion (a portion inn indicated by "Generation of all-in-focus image" shown in FIG. 14) where the focal length is less than or equal to 60 mm (the focal length 1*s*) and the processing is in the partially-focused image generation mode for a portion (a portion, 1*n*, indicated by "Generation of partially-focused image") where the focal length is greater than or equal to 60 mm.

It should be noted that, as described above, in a common zoom lens, the greater the focal length is, the greater $F_{no}$ is. Thus, it is expected that conditional transitions in actual conditions are conditional transitions as indicated by the solid line, provided that the conditions of Equation 5 which are the constraints due to the drive performance of the actuator are not taken into account. For example, when the conditions are that the focal length is equal to or less than 300 um, the conditions are given priority and the processing is always in the partially-focused image generation mode. The same can be seen in the case of FIG. 15.

Performing such a configuration and such a control allows the determination of the EDOF range, without significantly impeding user request even in the case where the zoom function for changing the focal length is provided.

Embodiment 2

A camera (an imaging apparatus) 1 according to an embodiment 2 of the present invention will be described with reference to FIGS. 16 and 17.

The basic configuration according to the embodiment 2 is the same as the configuration according to the embodiment 1, and is according to the descriptions of FIG. 3, FIGS. 6 to 15, and so on.

Figure 16:
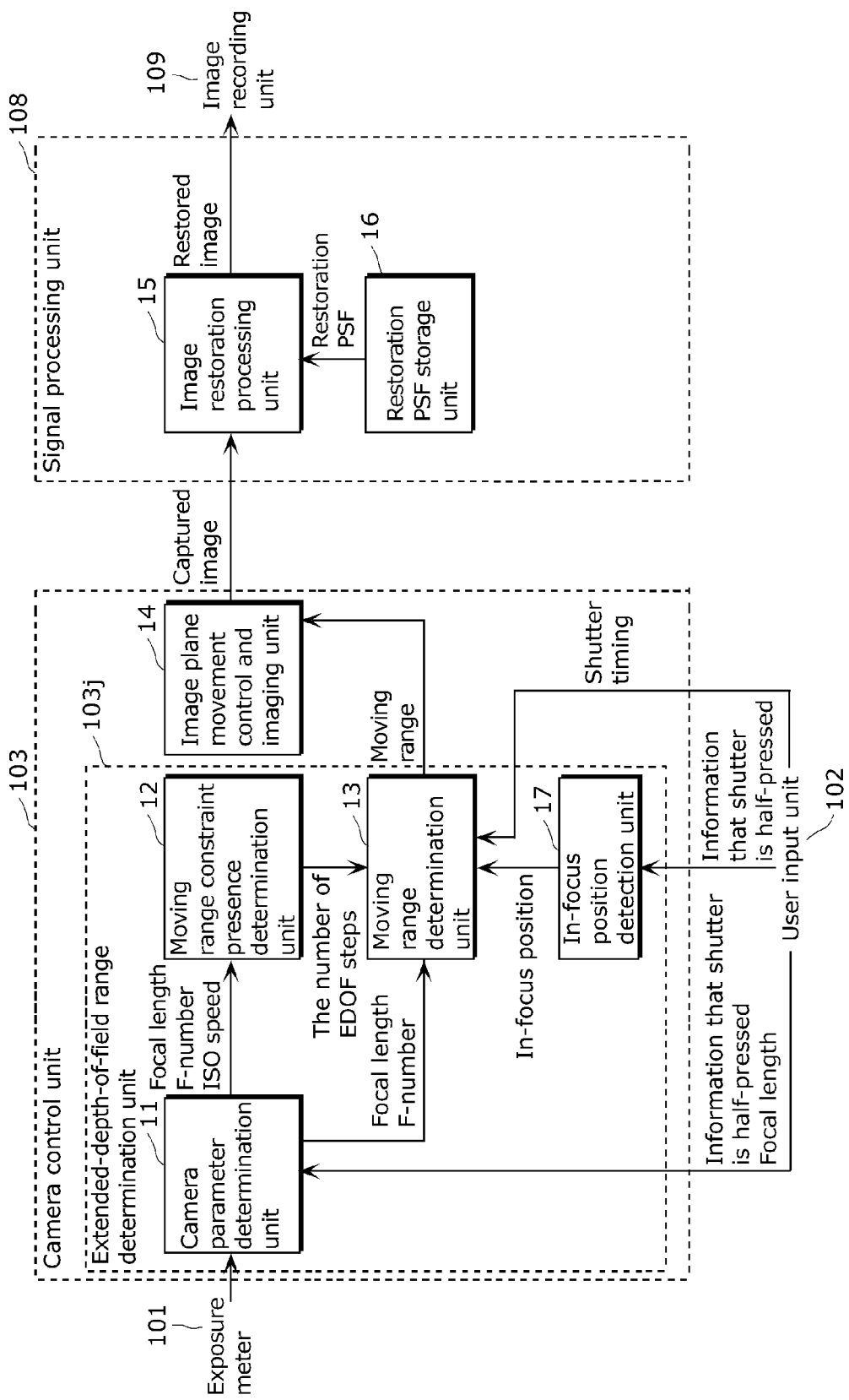
FIG. 16 is a block diagram of an imaging apparatus according to an embodiment 2.

FIG. 16 is a diagram showing a specific configuration of a camera control unit 103 according to the embodiment 2.

The camera control unit 103 includes a camera parameter determination unit 11, a moving range constraint presence determination unit 12, a moving range determination unit 13, an image plane movement control and imaging unit 14, and an in-focus position detection unit 17. Specific configuration and operation of a signal processing unit 108 are according to the configuration and operation shown in FIG. 4, FIG. 7, and so on mentioned above. The configurations and operations of respective blocks which are the camera parameter determination unit 11, the moving range constraint presence determination unit 12, the image plane movement control and imaging unit 14, and the in-focus position detection unit 17 are according to the configurations and operations of blocks according to the embodiment 1 that correspond to the respective blocks.

Here, the moving range determination unit 13 and the in-focus position detection unit 17 will be described in detail.

The in-focus position detection unit 17 detects an in-focus position which is input via the user input unit 102 when the shutter is being half-pressed. The in-focus position detection unit 17 can readily be implemented using a camera that has the autofocus functionality. In other words, the in-focus position detection unit 17 may detect, for example, a position focused by the autofocus functionality, as the in-focus position described above.

Figure 17:
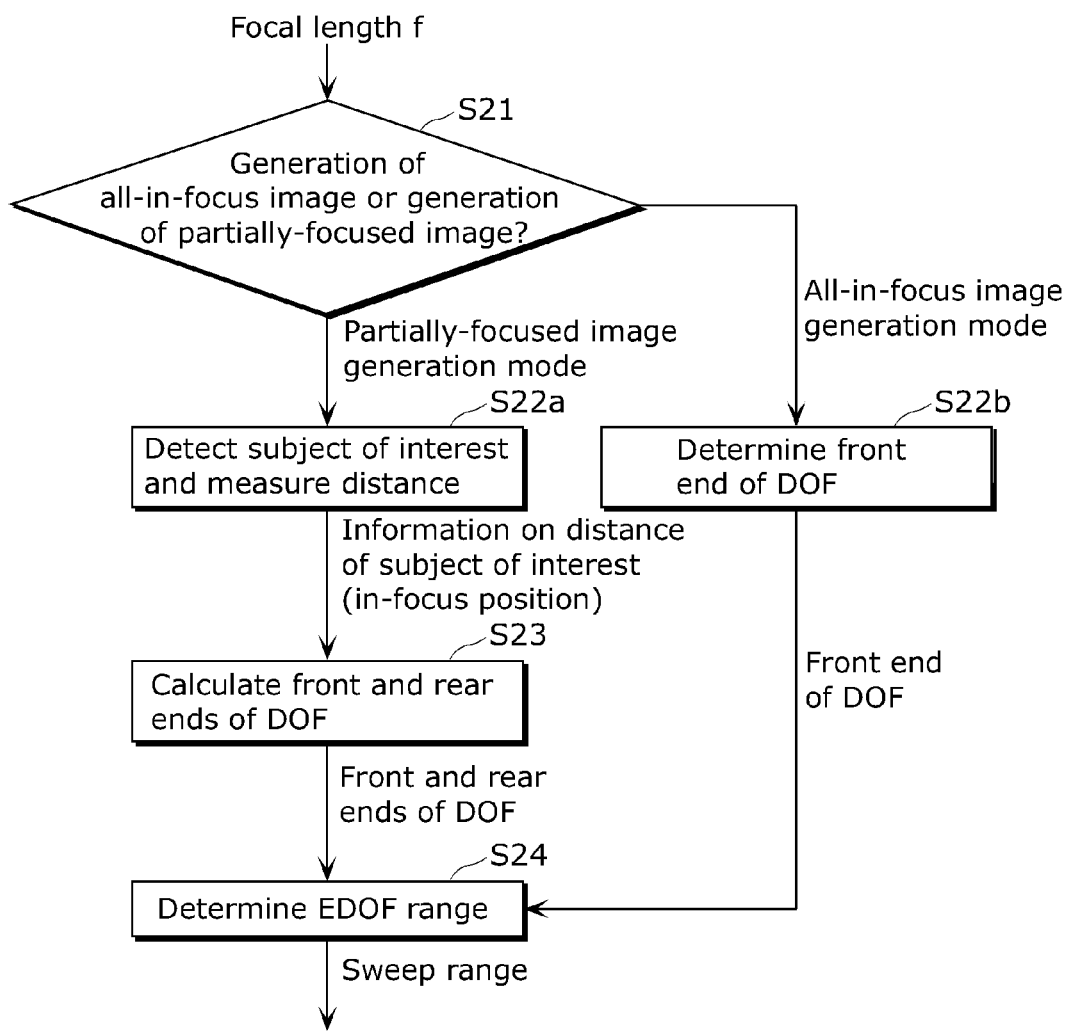
FIG. 17 is a diagram showing a processing flow when determining a moving range of a focus position in the embodiment 2.

FIG. 17 is a flowchart illustrating a processing flow of processing performed by the moving range determination unit 13.

Referring to FIG. 17, the processing by the moving range determination unit 13 will be described. As described in the embodiment 1, first, the moving range constraint presence determination unit 12 determines Δv that satisfies all the three equations. Next, it is determined whether the value of Δv has been determined based on Equation 6 or Equation 12 or determined by the constraints of other equation (S21). When the value of Δv has been determined not by Equation 12 ("Partially-focused image generation mode" in S21), which means that moving action for performing the generation of the definitional all-in-focus image cannot be carried out. Thus, in this case, the processing transitions to the processing in the partially-focused image generation mode (S22a and the following) in the flowchart illustrated in FIG. 17. If the value of Δv has been determined based on Equation 12, the processing transitions to processing in the all-in-focus image generation mode (S22b). The operation in the all-in-focus image generation mode is according to the embodiment 1.

Hereinafter, the case is described where the processing has transitioned to the processing in the partially-focused image generation mode. In this case, the moving range determination unit 13 determines in S22a a portion, the in-focus position of which is to move, of the moving range used for performing the generation of the definitional all-in-focus image. Assuming, for example, that the focal length is 20 mm and the defined range of the all-in-focus image is from 1 m to infinity, the image-plane-side moving distance is, through the lens formula indicated by Equation 3, a distance from the principal point location behind the lens to a range from 20.408 mm to 20.000 mm, i.e., 20.408 mm−20.000 mm=408 um. Furthermore, it is assumed that in the moving range constraint presence determination unit 12, the smallest upper bound of the upper bounds (the second equations of the equations) in the above-described three equations for Δv is 300 um (<408 um). Here, the moving range determination unit 13 determines a portion of the subject side range from 1 m to infinity, as the service area.

Here, as a method for allowing the user to specify the EDOF range, namely, the moving range, autofocus operation which is common in normal cameras is used. In other words, the in-focus position detection unit 17 acquires a subject of interest (such as a position at which a video of the subject of interest is displayed in an image) and information on a distance of the subject of interest (information on the distance from the imaging apparatus 1), which corresponds to a block, "Detect subject of interest and measure distance", (S22a) shown in FIG. 17.

Next, processing performed in a block, "Calculate front and rear ends of DOF" (S23) shown in FIG. 17 will be described. The in-focus position detection unit 17 detects only the distance of the subject of interest and the moving range determination unit 13 determines the front and rear ends of DOF by the EDOF. Examples of the determination method include the following method. In the method, the detected distance of the subject of interest in terms of the image-plane-side distance is located at the center of the range Δv. In other words, in the method, the front end of DOF and the rear end of DOF are determined as to be in the range the center of which is where the detected distance of the subject of interest is located. It is assumed that, a distance measurement of the subject of interest is, for example, 2 m. When the distance 2 m is converted into the image-plane-side distance by Equation 3, the image-plane-side distance is 20.202 mm. In the aforementioned example, the movement satisfying Δv=300 um=0.300 mm=0.150 mm×2 is possible. From this, the moving range is set to be from 20.202 mm−0.150 mm=20.052 mm to 20.202 mm+0.150 mm=20.352 mm. This centers the above-described position 20.202 mm in the range Δv. The subject side distance in this case is a distance 7.7 m−1.2 m=6.5 m in a range from 1.2 m to 7.7 m obtained by converting the image-plane-side range above-described into the subject-side range. In a block, "Determine EDOF range", (S24) shown in FIG. 17, based on the calculation result of the front and rear ends of DOF determined in such a manner, a range between the front and rear ends of DOF is determined as the actual EDOF range, namely, the moving range of the focus position.

As with the embodiment 1, performing such a configuration and such a control allows the determination of the EDOF range, without significantly impeding user request even in the case where the zoom function for changing the focal length is provided.

While the imaging apparatus according to the embodiments of the present invention is described above, the present invention is not limited to the embodiments.

Moreover, at least a part of the plurality of processing components included in the imaging apparatus according to the above embodiments are each implemented as an LSI which is an integrated circuit. These processing components may separately be mounted on one chip, or a part or the whole of the processing components may be mounted on one chip.

Moreover, the circuit integration is not limited to the LSI and may be implemented as a dedicated circuit or a general-purpose processor. An FPGA (Field Programmable Gate Array) which is programmable after manufacturing the LSI, or a reconfigurable processor in which connection or settings of circuit cells in LSI is reconfigurable, may be used.

Moreover, a part of the functionality of the imaging apparatus according to the embodiments of the present invention may be implemented by a processor such as CPU executing a program.

Furthermore, the present invention may be the above-described program, or a non-transitory computer-readable storage medium having stored therein the program. Moreover, the program can, of course, be distributed via transmission medium such as the Internet.

Moreover, at least parts of the functionality of the imaging apparatus according to the embodiments and the variation may be combined.

Moreover, numerals used in the above are merely illustrative for specifically describing the present invention and the present invention is not limited thereto.

Furthermore, various variations to the present embodiments that may be conceived by those skilled in the art are included in the present invention, without departing from the spirit of the present invention.

Figure 18:
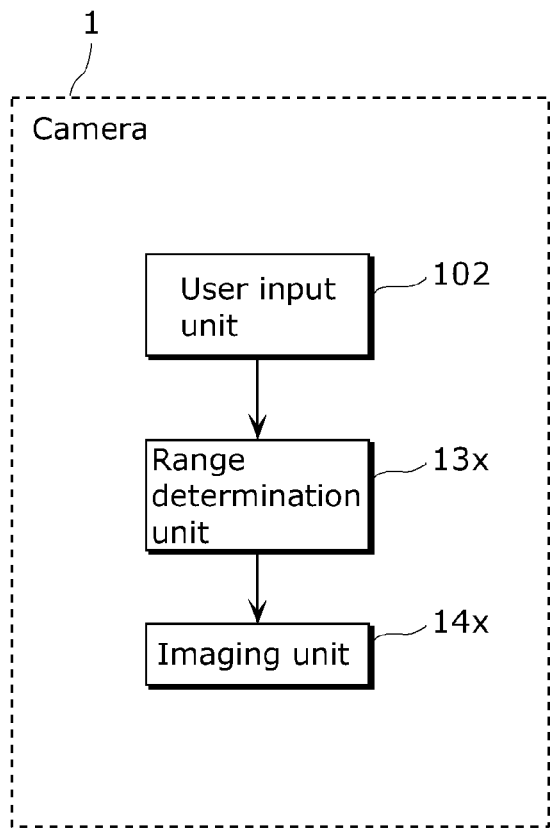
FIG. 18 is a diagram showing a configuration of a camera.
Figure 19:
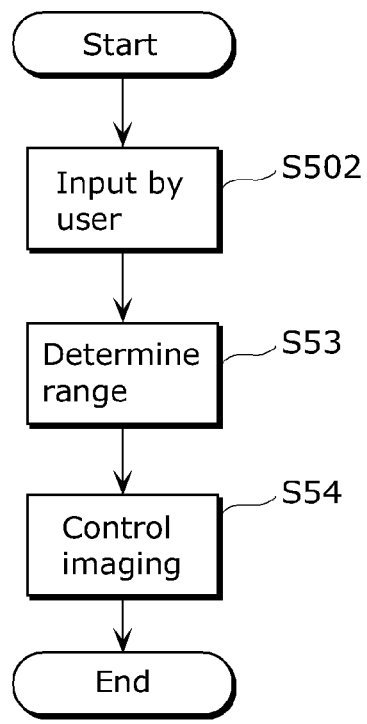
FIG. 19 is a flowchart illustrating processing steps of the camera.

It should be noted that the camera 1 (shown in FIG. 18, FIG. 6, and FIG. 7) is by way of example of the imaging apparatus, a range determination unit 13x(shown in FIG. 18) is by way of example of the moving range determination unit, and an imaging unit 14x(shown in FIG. 18) is by way of example of an imaging unit. For example, a range determination unit 103x may include the moving range determination unit 13. It should be noted that the range determination unit 103x may further include the moving range constraint presence determination unit 12 and so on. The imaging unit 14x may include the image plane movement control and imaging unit 14. It should be noted that the imaging unit 14x may further include the imaging device 107, one of or both the actuators mentioned above, and so on.

It should be noted that the functionality of each of the components in the embodiment may take the form as dedicated hardware or may be implemented by executing a software program suitable for each component. The functionality of each component may be implemented by CPU or a program execution unit, such as processor, loading and executing the software program stored in a hard disk or a recording medium such as a semiconductor memory. Here, the software program for implementing the imaging apparatus according to the embodiments is as follows.

In other words, a computer may execute: determining a moving range of an in-focus position, based on a focal length indicated by input accepted by an input unit included in an imaging apparatus for capturing an image in such a manner that the in-focus position moves during an exposure time to achieve an extended depth of field (S53); and controlling the operation of the imaging apparatus for causing the imaging apparatus to capture an image in such a manner that the in-focus position moves in the moving range during the exposure time. It should be noted that the computer may be, for example, a portion of the imaging apparatus.

A computer program for causing the computer to execute the processing steps may be used or a recording medium having the computer program stored therein may be used

INDUSTRIAL APPLICABILITY

An imaging apparatus according to the present invention allows an appropriate moving range of an in-focus position.

The imaging apparatus and an imaging method according to the present invention allow the determination of an EDOF range, without significantly impeding user request even in a zoom function for changing a focal length.

The configurations are effective in fields of, for example, consumer or professional imaging apparatuses (digital still cameras).

REFERENCE SIGNS LIST

1 Camera
11 Camera parameter determination unit
12 Moving range constraint presence determination unit
13 Moving range determination unit
13x, 103x Range determination unit
14 Image plane movement control and imaging unit
14x Imaging unit
15 Image restoration processing unit
16 Restoration PSF storage unit
17 In-focus position detection unit
101 Exposure meter
102 User input unit
103 Camera control unit
103j Extended-depth-of-field range determination unit
104 Lens
105 Aperture
106 Shutter
107 Imaging device
108 Signal processing unit
109 Image recording unit

The invention claimed is:

1. An imaging apparatus for capturing an image in such a manner that an in-focus position moves during an exposure time to achieve an extended depth of field, the imaging apparatus comprising:
    an input unit configured to accept input of a focal length;
    a moving range determination unit configured to determine a moving range of an in-focus position, based on the focal length, the moving range depending on the focal length; and
    an imaging unit configured to capture an image in such a manner that the in-focus position moves in the moving range during an exposure time,
    wherein the moving range determination unit is configured to determine the moving range an extent of which does not exceed an upper bound determined based on the focal length,
    wherein the upper bound includes a first upper bound corresponding to a position at which an image of an object having a predetermined size is captured to a predefined size, and
    wherein the upper bound includes a second upper bound for satisfying a predetermined image quality.

2. The imaging apparatus according to claim 1,
    wherein the upper bound includes the first upper bound and the second upper bound, and
    when the first upper bound is greater than the second upper bound, the moving range determination unit is configured to determine, as the moving range, a range that includes a position obtained from information on a subject acquired by the input unit.

3. The imaging apparatus according to claim 1, further comprising:
    an exposure meter; and
    a camera parameter determination unit configured to determine a shutter speed, an F-number, and an ISO (International Organization for Standardization) speed, based on brightness information for a capturing condition obtained using the exposure meter,
    wherein the moving range determination unit is configured to determine the moving range, based on at least one of the determined shutter speed, the determined F-number, and the determined ISO speed, in addition to the focal length.

4. The imaging apparatus according to claim 2, wherein the input unit is configured to specify the subject, and
the extended-depth-of-field range determination unit:
includes an in-focus position detection unit configured to measure a distance to the specified subject; and
when the first upper bound is greater than the second upper bound, is configured to determine, as the moving range, a range that includes a position of the measured distance.

5. The imaging apparatus according to claim 1, further comprising
a signal processing unit configured to perform a restoration process for enhancing sharpness of a captured image to be outputted by the imaging unit.

6. The imaging apparatus according to claim 1, wherein the first upper bound is $\Delta v_{AIF}$ specified by the following equation:

Equation 1:

$$\Delta v_{AIF} = \frac{xf}{2k \tan\frac{\theta_0}{2} - x} \quad (1)$$

where f represents the focal length, $\theta_0$ represents an angle of view, k represents a distance to a subject, and x represents a size of an imaging device.

7. The imaging apparatus according to claim 1, wherein the second upper bound is $\Delta v_{NLim}$ specified by the following equation:

Equation 2:

$$\Delta v_{NLim} = \frac{2^{\frac{N}{2}+1} F_{no} f \varepsilon}{f - 2^{\frac{N}{2}+1} F_{no} \varepsilon} \quad (2)$$

where f represents the focal length, N represents an amount of extension of depth of field, $F_{no}$ represents an F-number, and $\varepsilon$ represents a permissible circle of confusion.

8. The imaging apparatus according to claim 2, wherein the moving range determination unit is configured to:
when the first upper bound is smaller than the second upper bound, determine a range from a position corresponding to infinity to a position of the first upper bound, as the moving range; and
when the first upper bound is greater than the second upper bound, determine a portion of the range to the position of the first upper bound, as the moving range, and
the portion has a dimension less than or equal to the second upper bound and includes the position obtained from the information on the subject.

9. An imaging method for capturing an image in such a manner that an in-focus position moves during an exposure time to achieve an extended depth of field, the imaging method comprising:

accepting input of a focal length;
determining a moving range of an in-focus position, based on the focal length, the moving range depending on the focal length; and
capturing an image in such a manner that the in-focus position moves in the moving range during an exposure time,
wherein an extent of the moving range determined in said determining does not exceed an upper bound determined based on the focal length,
wherein the upper bound includes a first upper bound corresponding to a position at which an image of an object having a predetermined size is captured to a predefined size, and
wherein the upper bound includes a second upper bound for satisfying a predetermined image quality.

10. An integrated circuit comprising:
a moving range determination unit configured to determine a moving range of an in-focus position, based on a focal length indicated by input accepted by an input unit included in an imaging apparatus for capturing an image in such a manner that the in-focus position moves during an exposure time to achieve an extended depth of field, the moving range depending on the focal length; and
an imaging control unit configured to cause the imaging apparatus to capture an image in such a manner that the in-focus position moves in the moving range during the exposure time,
wherein the moving range determination unit is configured to determine the moving range an extent of which does not exceed an upper bound determined based on the focal length,
wherein the upper bound includes a first upper bound corresponding to a position at which an image of an object having a predetermined size is captured to a predefined size, and
wherein the upper bound includes a second upper bound for satisfying a predetermined image quality.

11. A non-transitory computer-readable recording medium having stored therein a computer program for causing a computer to execute:
determining a moving range of an in-focus position, based on a focal length indicated by input accepted by an input unit included in an imaging apparatus for capturing an image in such a manner that the in-focus position moves during an exposure time to achieve an extended depth of field, the moving range depending on the focal length; and
causing the imaging apparatus to capture an image in such a manner that the in-focus position moves in the moving range during the exposure time,
wherein an extent of the moving range determined in said determining does not exceed an upper bound determined based on the focal length,
wherein the upper bound includes a first upper bound corresponding to a position at which an image of an object having a predetermined size is captured to a predefined size, and
wherein the upper bound includes a second upper bound for satisfying a predetermined image quality.

* * * * *